(12) United States Patent
Goi et al.

(10) Patent No.: US 10,742,041 B2
(45) Date of Patent: Aug. 11, 2020

(54) SYNCHRONOUS POWER-ON/OFF CONTROL METHOD AND SYNCHRONOUS POWER-ON/OFF CONTROLLER

(71) Applicant: KAWASAKI JUKOGYO KABUSHIKI KAISHA, Kobe-shi, Hyogo (JP)

(72) Inventors: Tatsuhiko Goi, Kobe (JP); Kenichi Nakashima, Kobe (JP); Kazushige Sugimoto, Amagasaki (JP); Masaaki Higashi, Kobe (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 174 days.

(21) Appl. No.: 16/082,350

(22) PCT Filed: Mar. 7, 2016

(86) PCT No.: PCT/JP2016/001225
§ 371 (c)(1),
(2) Date: Sep. 5, 2018

(87) PCT Pub. No.: WO2017/154035
PCT Pub. Date: Sep. 14, 2017

(65) Prior Publication Data
US 2019/0097428 A1 Mar. 28, 2019

(51) Int. Cl.
*H02J 3/42* (2006.01)
*H02P 9/10* (2006.01)
(Continued)

(52) U.S. Cl.
CPC .............. *H02J 3/42* (2013.01); *B64D 31/14* (2013.01); *F01D 15/10* (2013.01); *F16H 15/38* (2013.01);
(Continued)

(58) Field of Classification Search
CPC ........................................................ H02J 3/42
See application file for complete search history.

(56) References Cited

U.S. PATENT DOCUMENTS 6,051,941 A * 4/2000 Sudhoff .................. B60L 50/10
318/140
6,388,416 B1 * 5/2002 Nakatani ................ H02P 6/085
318/700

FOREIGN PATENT DOCUMENTS

JP 05-184135 A 7/1993
JP 2003-284246 A 10/2003
(Continued)

*Primary Examiner* — Daniel J Cavallari
(74) *Attorney, Agent, or Firm* — Sughrue Mion, PLLC

(57) ABSTRACT

A power-on/off command is output to a breaker for switching when a frequency difference between a plurality of electric power supply sources is within a predetermined range and a phase difference between the plurality of electric power supply sources is within a predetermined range, in switching of electric power supply between the plurality of electric power supply sources. A generator drive rotation speed of a transmission device is feedback controlled so that the frequency difference is maintained at a value within the predetermined range and the phase difference is maintained at a value within the predetermined range when the detected frequency difference is within the predetermined range and the detected phase difference is within the predetermined range. A generator rotation speed command is calculated by adding to the rotation speed command of the transmission device an output value obtained by subjecting the detected phase difference to a proportional-integral-control.

14 Claims, 15 Drawing Sheets

(51) Int. Cl.
*B64D 31/14* (2006.01)
*F01D 15/10* (2006.01)
*F16H 15/38* (2006.01)
*F16H 61/664* (2006.01)
*H02P 9/48* (2006.01)
*H02P 101/25* (2016.01)
*H02P 101/30* (2015.01)

(52) U.S. Cl.
CPC ............ *F16H 61/6649* (2013.01); *H02P 9/10* (2013.01); *H02P 9/48* (2013.01); *B64D 2221/00* (2013.01); *F05D 2220/323* (2013.01); *F05D 2220/76* (2013.01); *F05D 2260/402* (2013.01); *H02P 2101/25* (2015.01); *H02P 2101/30* (2015.01)

(56) References Cited

FOREIGN PATENT DOCUMENTS

| | | |
|---|---|---|
| JP | 3647816 B2 | 5/2005 |
| JP | 2007-330072 A | 12/2007 |
| JP | 2010-090932 A | 4/2010 |

\* cited by examiner

SYNCHRONOUS POWER-ON/OFF CONTROL METHOD AND SYNCHRONOUS POWER-ON/OFF CONTROLLER

CROSS REFERENCE TO RELATED APPLICATIONS

This Application is a National Stage of International Application No. PCT/JP2016/001225 filed Mar. 7, 2016.

TECHNICAL FIELD

The present invention relates to a control method and a controller which control synchronous power-on/off of a breaker in a case where electric power supply is switched between a plurality of electric power supply sources. In particular, the present invention relates to a synchronous power-on/off control method and a synchronous power-on/off controller which are used in a case where at least one electric power supply source includes an electric generator driven via a transmission.

BACKGROUND ART

Many aircrafts include main electric power supplies which are electric generators driven by main engines for aircraft, and auxiliary electric power supplies which are auxiliary power units (APU) including electric generators which are driven by auxiliary engines, batteries, and the like.

As an example of the electric generator driven by the main engine, for example, there is an integrated drive generator (hereinafter will be referred to as "IDG"). The IDG is driven by the main engine to generate electric power and supplies the electric power to components within the aircraft, while the main engine is started. Typically, the APU generates electric power and supplies the electric power to the components within the aircraft, in place of the IDG, while the aircraft is parked, and the main engine is deactivated (running of the main engine is stopped). The battery is used to supply minimum and required electric power for a limited time, in a case where the IDG and the APU are not used.

While the aircraft is parked and the IDG and the APU are deactivated, an external ground power unit (GPU) is connected to the aircraft to supply the electric power to the components within the aircraft.

In a case where electric power supply is switched between the plurality of electric power supply sources without instantaneous interruption (temporary blackout), a synchronous power-on/off control is performed. The synchronous power-on/off control is defined as a control for synchronous power-on/off of breakers for switching, in a state in which voltages, frequencies, and phases are substantially equalized between the plurality of electric power supply sources. As an example of techniques for this synchronous power-on/off control, for example, Patent Literature 1 discloses a method and device for synchronous power-on/off.

Patent Literature 1 discloses that a generator drive rotation speed of a transmission provided between an electric generator and an engine for driving the electric generator is feedback controlled so that a frequency difference between the plurality of electric power supply sources is within a predetermined range and a phase difference between the plurality of electric power supply sources is within a predetermined range. With this control, even in a case where the phase difference does no change dynamically (a change in the phase difference stagnates), the phase difference which meets a synchronous power-on/off condition can be quickly realized by positively controlling the phase difference, and this phase difference can be maintained at a value within a predetermined range for a long time. Therefore, the influence of a disturbance can be lessened during the synchronous power-on/off.

CITATION LIST

Patent Literature

Patent Literature 1: Japanese Patent No. 3647816

SUMMARY OF INVENTION

Technical Problem

In recent years, especially in the field of aircraft, there has been a tendency that conditions for operating a fuselage are severer. For this reason, in the synchronous power-on/off control, required conditions have been severer.

Specifically, in recent years, it is required that switching without instantaneous interruption can occur in the aircraft all the time after the aircraft lands. For example, under a normal temperature condition or a high-temperature condition, the switching without instantaneous interruption can occur by a conventional synchronous power-on/off control. However, under a low-temperature condition, changes of conditions (e.g., viscosity of lubricating oil of a transmission, characteristics of a control valve, etc.) of the electric power supply sources are accumulated, and a great change in the phase difference continues and the phase difference does not change dynamically (actively). In this case, if the synchronous power-on/off fails once, it takes time to perform the synchronous power-on/off again. Under the circumstances, it is impossible to meet the requirement that switching without instantaneous interruption can occur all the time.

The present invention has been developed to solve the above-described problems, and an object of the present invention is to provide a synchronous power-on/off control method and a synchronous power-on/off controller which can realize good synchronous power-on/off while suppressing influences due to changes in conditions.

Solution to Problem

To solve the above-described problem, according to the present invention, there is provided a synchronous power-on/off control method in which a power-on/off command is output to a breaker for switching in a case where a frequency difference between a plurality of electric power supply sources is within a predetermined range and a phase difference between the plurality of electric power supply sources is within a predetermined range, in switching of electric power supply between the plurality of electric power supply sources, at least one of the plurality of electric power supply sources including an electric generator which is driven by a driving power source via a transmission device, the synchronous power-on/off control method comprising: detecting the frequency difference and the phase difference between the plurality of electric power supply sources; determining whether or not the detected frequency difference is within the predetermined range, and whether or not the detected phase difference is within the predetermined range; feedback controlling a generator drive rotation speed of the transmission device so that the frequency difference is maintained at a value within the predetermined range and the phase difference is maintained at a value within the predetermined range, in a case where it is determined that the detected frequency difference is within the predetermined range and the detected phase difference is within the predetermined range; controlling the generator drive rotation speed of the transmission device by providing an offset to a rotation speed command of the transmission device, in a case where it is determined that the detected frequency difference is not within the predetermined range and the detected phase difference is not within the predetermined range; and calculating a generator rotation speed command by adding to the rotation speed command of the transmission device an output value obtained by subjecting the detected phase difference to a proportional-integral-control, feedback controlling the generator drive rotation speed, based on the generator rotation speed command, and outputting the power-on/off command to the breaker, in a case where it is determined that the detected frequency difference is within the predetermined range and the detected phase difference is within the predetermined range.

In accordance with this method, the phase difference feedback control is continuously performed until the switching by the breaker is completed, and the proportional-integral (PI) control is performed instead of a proportional (P) control, in a case where the phase difference is within the predetermined range. With this control, a slight phase difference is cancelled, and the phase difference can be maintained at almost zero. Thus, it becomes possible to maintain stable synchronous power-on/off conditions for a long period of time, and to quickly realize good synchronous power-on/off conditions. In addition, it becomes possible to more effectively suppress an impact generated in the synchronous power-on/off. Since the phase difference can be made substantially zero, the predetermined range of the phase difference can be expanded than in the conventional method. This allows the phase difference to quickly converge at zero. For example, even in a situation in which the oil temperature is rapidly reduced, the synchronous power-on/off conditions can be quickly realized.

The above-described synchronous power-on/off control method may further comprise detecting a voltage difference between the plurality of electric power supply sources, and outputting a field current command to the electric generator so that the detected voltage difference is within a predetermined range; and outputting the power-on/off command to the breaker in a case where the detected voltage difference is within the predetermined range, the frequency difference between the plurality of electric power supply sources is within the predetermined range and the phase difference between the plurality of electric power supply sources is within the predetermined range.

In accordance with this method, the synchronous power-on/off control method can realize a voltage control function for controlling the supply voltage (output voltage) of the electric generator at a constant voltage, as well as a synchronous power-on/off control function. This makes it possible to well control both of the synchronous power-on/off and the voltage in the electric system including the plurality of electric power supply sources.

The above-described synchronous power-on/off control method may further comprise: determining which of the plurality of electric power supply sources is connected to a load, and shifting the predetermine ranges so that a frequency of the electric power supply source connected to the load is lower than a frequency of the electric power supply source which is not connected to the load and a phase of the electric power supply source connected to the load is delayed with respect to a phase of the electric power supply source which is not connected to the load.

In accordance with this method, the predetermined range of the phase difference which was close to the neutral position is shifted to a lower position or a higher position. Since the predetermined range of the phase difference is shifted to a lower position or a higher position depending on the situation, the impact in the synchronous power-on/off can be effectively suppressed.

In the above-described synchronous power-on/off control method, the transmission device may include a toroidal continuously variable transmission (toroidal CVT).

Since the transmission device includes the toroidal continuously variable transmission which is highly responsive (is able to realize a quick response), the rotation speed of the electric generator can be well adjusted, and the generator drive rotation speed can be well feedback-controlled. This makes it possible to realize good synchronous power-on/off conditions in a shorter time.

In the above-described synchronous power-on/off control method, a tilt motion angle of a power roller included in the transmission device may be adjusted by a hydraulic servo system, the hydraulic servo system may include a hydraulic actuator and a servo valve which drives the hydraulic actuator, and the servo valve may be driven by a servo valve opening rate command based on an output rotation speed of the driving power source, the generator drive rotation speed of the transmission device, and the generator rotation speed command.

For example, in a case where various noises are accumulated in the hydraulic servo system due to a rapid decrease in the oil temperature, and thereby the change in the phase difference stagnates, it becomes possible to quickly realize good synchronous power-on/off conditions without considering that the change in the phase difference stagnates, and more effectively suppress an impact generated in the synchronous power-on/off.

In the above-described synchronous power-on/off control method, the toroidal continuously variable transmission may include a clamping mechanism which generates a clamping force for pushing a power roller against an input disc and an output disc included in the transmission device.

In the above-described synchronous power-on/off control method, the driving power source may be an engine for an aircraft.

In the field of the aircraft, an allowable range in the control is very narrow compared to a general case. In accordance with the above-described method, the phase difference can be made substantially zero in the phase difference feedback control. Therefore, even in a case where the allowable range in the control is very narrow like switching without instantaneous interruption (temporary blackout) in the field of the aircraft, good synchronous power-on/off can be realized.

To solve the above-described problem, there is provided a synchronous power-on/off controller in which a power on/off command is output to a breaker for switching in a case where a frequency difference between a plurality of electric power supply sources is within a predetermined range and a phase difference between the plurality of electric power supply sources is within a predetermined range, in switching of electric power supply between the plurality of electric power supply sources, at least one of the plurality of electric power supply sources including an electric generator which is driven by a driving power source via a transmission device, the synchronous power-on/off controller comprising: a frequency difference detector which detects the frequency difference between the plurality of electric power supply sources; a phase difference detector which detects the phase difference between the plurality of electric power supply sources; and a synchronous power-on/off control unit which determines whether or not the detected frequency difference is within the predetermined range and whether or not the detected phase difference is within the predetermined range, generates the power-on/off command, and outputs the power-on/off command to the breaker; wherein the synchronous power-on/off control unit feedback-controls a generator drive rotation speed of the transmission device so that the frequency difference is maintained at a value within the predetermined range and the phase difference is maintained at a value within the predetermined range, in a case where the synchronous power-on/off control unit determines that the detected frequency difference is within the predetermined range and the detected phase difference is within the predetermined range, wherein the synchronous power-on/off control unit controls the generator drive rotation speed of the transmission device by providing an offset to a rotation speed command of the transmission device, in a case where the synchronous power-on/off control unit determines that the detected frequency difference is not within the predetermined range and the detected phase difference is not within the predetermined range, wherein the synchronous power-on/off control unit calculates a generator rotation speed command by adding to the rotation speed command of the transmission device an output value obtained by subjecting the detected phase difference to a proportional-integral-control, feedback-controls the generator drive rotation speed based on the generator rotation speed command, and outputs the power-on/off command to the breaker, in a case where the synchronous power-on/off control unit determines that the detected frequency difference is within the predetermined range and the detected phase difference is within the predetermined range.

In accordance with this configuration, the phase difference feedback control is continuously performed until the switching between the plurality of electric power supply sources is completed, and the proportional-integral (PI) control is performed instead of a proportional (P) control, in a case where the phase difference is within the predetermined range. With this control, a slight phase difference is cancelled, and the phase difference can be maintained at almost zero. Thus, it becomes possible to maintain stable synchronous power-on/off conditions for a long period of time, and to quickly realize good synchronous power-on/off conditions. In addition, it becomes possible to more effectively suppress an impact generated in the synchronous power-on/off. Since the phase difference can be made substantially zero, the predetermined range of the phase difference can be expanded than in the conventional example. This allows the phase difference to quickly converge at zero, for example, even in a situation in which the oil temperature is rapidly reduced, the synchronous power-on/off conditions can be quickly realized.

The synchronous power-on/off controller may further comprise a voltage difference detector which detects a voltage difference between the plurality of electric power supply sources; and a voltage adjustment unit which outputs a field current command to the electric generator so that the detected voltage difference is within a predetermined range, wherein the synchronous power-on/off control unit outputs the power-on/off command to the breaker in a case where the detected voltage difference is within the predetermined range, the frequency difference between the plurality of electric power supply sources is within the predetermined range and the phase difference between the plurality of electric power supply sources is within the predetermined range.

In accordance with this configuration, the synchronous power-on/off controller can realize a voltage control function for controlling the supply voltage (output voltage) of the electric generator at a constant voltage, as well as a synchronous power-on/off control function. This makes it possible to well control both of the synchronous power-on/off and the voltage in the electric system including the plurality of electric power supply sources.

The synchronous power-on/off controller with the above-described configuration may further comprise: an electric power detector which determines which of the plurality of electric power supply sources is connected to a load, and shifts the predetermine ranges so that a frequency of the electric power supply source connected to the load is lower than a frequency of the electric power supply source which is not connected to the load and a phase of the electric power supply source connected to the load is delayed with respect to a phase of the electric power supply source which is not connected to the load.

In accordance with this configuration, the predetermined range of the phase difference which was close to the neutral position is shifted to a lower position or a higher position. Since the predetermined range of the phase difference is shifted to a lower position or a higher position depending on the situation, the impact in the synchronous power-on/off can be effectively suppressed.

In the synchronous power-on/off controller with the above-described configuration, the transmission device may include a toroidal continuously variable transmission.

In the above-described configuration, since the transmission device includes the toroidal continuously variable transmission which is highly responsive (is able to realize a quick response), the rotation speed of the electric generator can be well adjusted, and the generator drive rotation speed can be well feedback-controlled. This makes it possible to realize good synchronous power-on/off conditions in a shorter time.

In the synchronous power-on/off controller with the above-described configuration, a tilt motion angle of a power roller included in the transmission device may be adjusted by a hydraulic servo system, and the hydraulic servo system may include a hydraulic actuator and a servo valve which drives the hydraulic actuator, the synchronous power-on/off controller further comprising: a rotation speed control unit which generates a servo valve opening rate command based on an output rotation speed of the driving power source, the generator drive rotation speed of the transmission device, and the generator rotation speed command calculated by the synchronous power-on/off control unit, wherein the servo valve may be driven based on the servo valve opening rate command.

For example, in a case where various noises are accumulated in the hydraulic servo system due to a rapid decrease in the oil temperature, and thereby the change in the phase difference stagnates, it becomes possible to quickly realize good synchronous power-on/off conditions without considering that the change in the phase difference stagnates, and more effectively suppress an impact generated in the synchronous power-on/off.

In the synchronous power-on/off controller, the toroidal continuously variable transmission may include a clamping mechanism which generates a clamping force for pushing a power roller against an input disc and an output disc included in the transmission device.

In the synchronous power-on/off controller, the driving power source may be an engine for an aircraft.

In the field of the aircraft, an allowable (permissible) range in the control is very narrow compared to a general case. In accordance with the above-described configuration, the phase difference can be made substantially zero in the phase difference feedback control. Therefore, even in a case where the allowable range in the control is very narrow like switching without instantaneous interruption (temporary blackout) in the field of the aircraft, good synchronous power-on/off can be realized.

The above and further objects, features and advantages of the present invention will more fully be apparent from the following detailed description of a preferred embodiment with reference to the accompanying drawings.

Advantageous Effects of Invention

In accordance with the present invention, it is possible to provide a synchronous power-on/off control method and a synchronous power-on/off controller which can realize good synchronous power-on/off while suppressing effects due to changes in conditions.

DESCRIPTION OF EMBODIMENTS

Hereinafter, preferred embodiments of the present invention will be described with reference to the drawings. Throughout the drawings, the same or corresponding constituents are designated by the same reference symbols, and will not be described in repetition.

Embodiment 1

In Embodiment 1, the present invention will be specifically described by use of an example in which a synchronous power-on/off control method and a synchronous power-on/off controller according to the present invention are applied to an electric power generation apparatus for aircraft. First of all, a specific example of the electric power generation apparatus for aircraft will be described with reference to FIGS. 1 to 3.

[Exemplary Configuration of Electric Generator for Aircraft]

Figure 1:
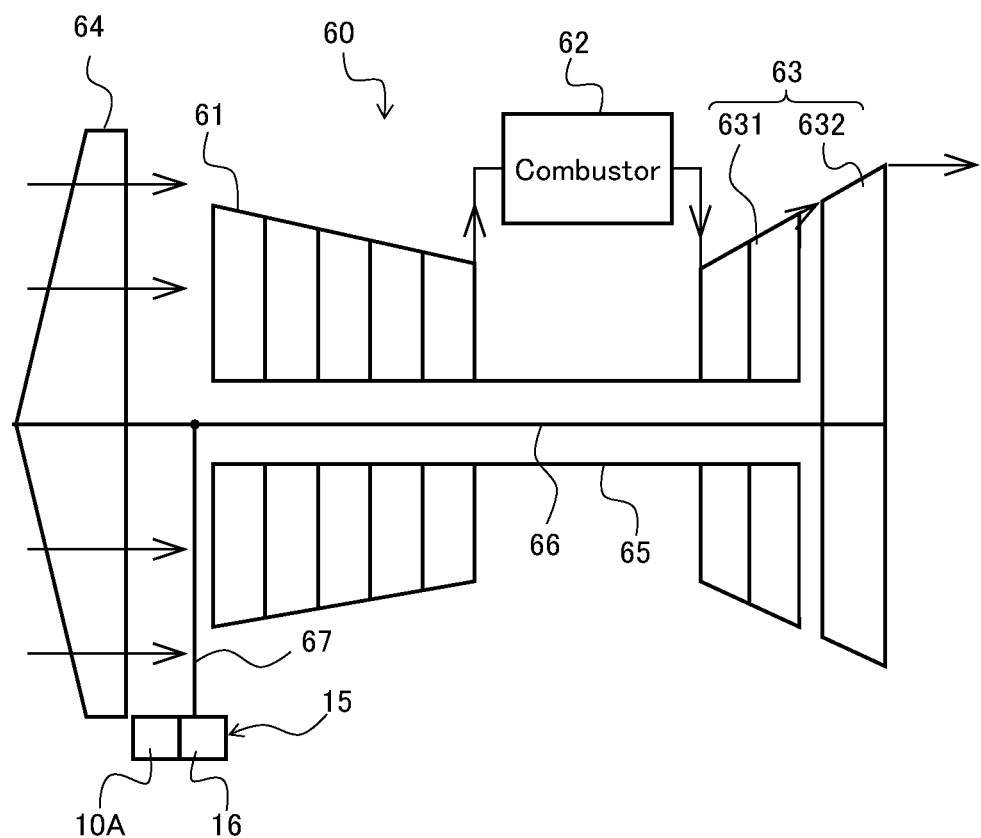
FIG. 1 is a schematic view showing an example of a configuration in which an electric power generation apparatus for an aircraft to which a synchronous power-on/off control method and a synchronous power-on/off controller according to Embodiment 1 of the present invention are applied is mounted on an engine.

As schematically shown in FIG. 1, an electric power generation apparatus 10A for use with aircraft according to Embodiment 1 (hereinafter will be referred to as "electric power generation apparatus 10A") is mounted on the side portion of an engine 60 of the aircraft. The engine 60 is a biaxial fan engine. The engine 60 includes a compressor 61, a combustor 62, a turbine 63, and a fan 64. In addition, as rotary shafts, the engine 60 includes a high-pressure shaft 65 with a hollow space, and a low-pressure shaft 66 inserted into the hollow space of the high-pressure shaft 65. As shown in FIG. 1, compressed air supplied from the compressor 61 is combusted in the combustor 62, and a combustion gas in high-temperature and high-pressure states generated by the combustion is supplied to the turbine 63.

The turbine 63 includes a high-pressure turbine 631 in a previous state and a low-pressure turbine 632 in a subsequent stage. The compressor 61 is coupled to the high-pressure turbine 631 via the hollow high-pressure shaft 65. The compressor 61 is driven to rotate by the high-pressure turbine 631. The fan 64 is coupled to the low-pressure turbine 632 via the low-pressure shaft 66 and is driven to rotate by the low-pressure turbine 632. By a jet flow of the combustion gas injected from the low-pressure turbine 632 and a high-velocity air flow generated by the fan 64, an engine thrust can be obtained.

The first end portion of a coupling shaft 67 is coupled to the low-pressure shaft 66 at a location that is rearward of the fan 64 via a bevel gear (not shown). A gear box 16 of an auxiliary device 15 is coupled to the second end portion of the coupling shaft 67. A transmission input shaft (see FIG. 2) which will be described later is coupled to the gear box 16, and the rotation of the low-pressure shaft 66 is transmitted to the electric power generation apparatus 10A via the gear box 16. The configuration for mounting the electric power generation apparatus 10A on the engine 60 is not limited to this, and other known configurations may be used.

Figure 2:
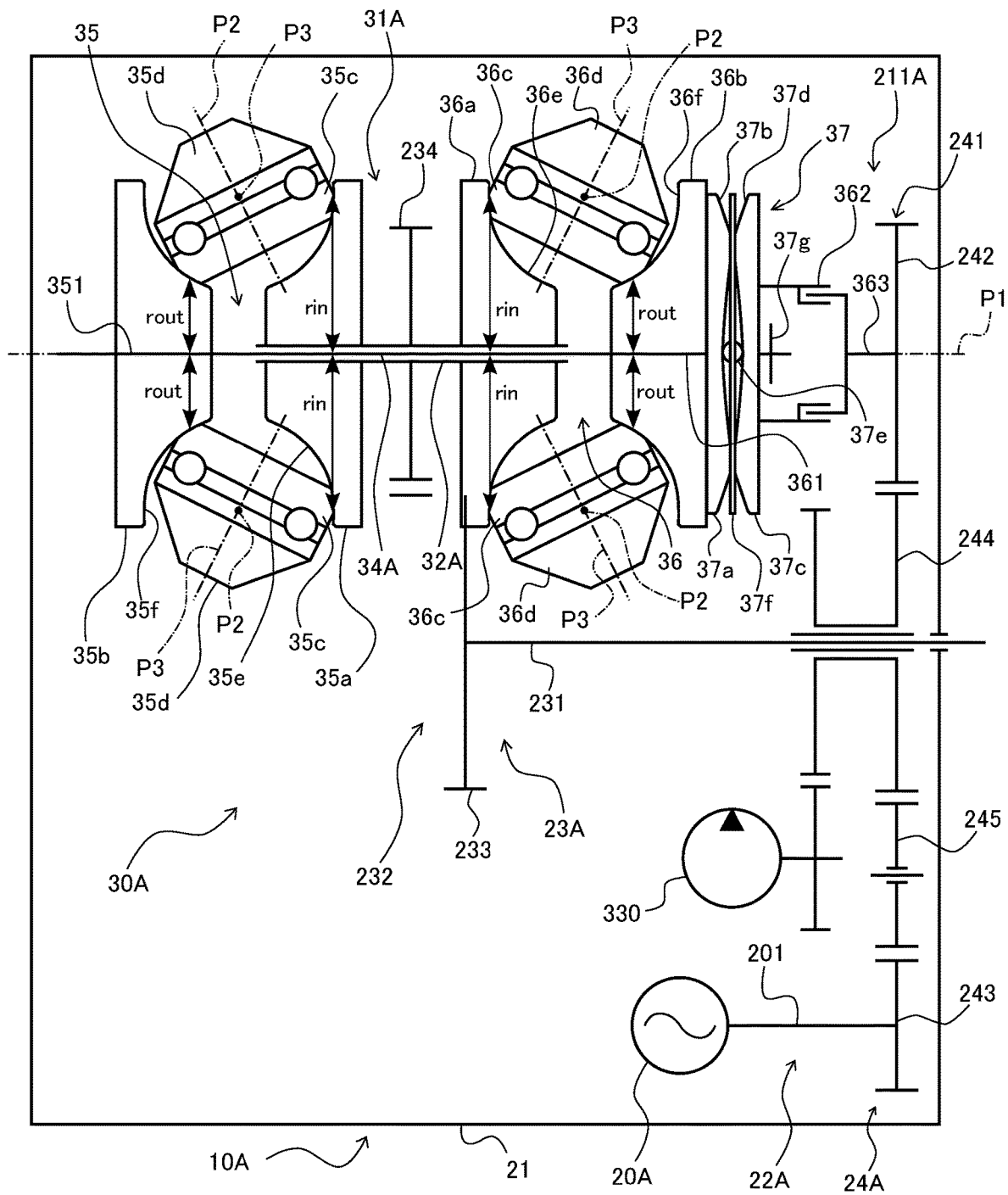
FIG. 2 is a schematic view showing an example of the specific configuration of the electric power generation apparatus for the aircraft of FIG. 1.

As shown in FIG. 1, the electric power generation apparatus 10A is disposed in front of the gear box 16 which is operative in response to the operation of the low-pressure shaft 66 of the engine 60. As schematically shown in FIG. 2, the electric power generation apparatus 10A includes an electric generator 20A and a transmission device 30A. In addition, the electric power generation apparatus 10A includes a casing 21 mounted on the engine 60 (not shown in FIG. 2). The casing 21 accommodates therein the electric generator 20A and the transmission device 30A. The transmission device 30A includes a constant speed drive (CSD) 22A including a toroidal continuously variable transmission (toroidal CVT) 31A.

An oil sump (not shown) which reserves oil used for multiple purposes is provided inside the casing 21. An oil pump unit (not shown) is also accommodated in the casing 21. The uses of the oil include, for example, traction drive by the toroidal CVT 31A, actuation of hydraulic devices or hydraulic mechanisms, cooling of the electric generator 20A, and lubrication of the CSD 22A. The oil pump unit is driven by the output of the toroidal CVT 31A. For example, the oil pump unit includes a suction pump (not shown) and a feeding pump such as a hydraulic pump 330. The suction pump of the oil pump unit suctions up the oil from the oil sump. The feeding pump of the oil pump unit feeds the oil for the above-described uses.

Inside the casing 21, the toroidal CVT 31A, the electric generator 20A, and the oil pump unit are vertically arranged. Alternatively, the electric power generation apparatus 10A may be disposed rearward of the gear box 16. The electric generator 20A is disposed above the toroidal CVT 31A and driven by the output of the toroidal CVT 31A.

As described above, the toroidal CVT 31A is coupled to the rotary shaft (low-pressure shaft 66) of the engine 60. Therefore, the engine 60 is a driving power source for the electric generator 20A. The electric generator 20A is driven to rotate by the engine 60 via the toroidal CVT 31A to generate electric power, and supplies the electric power to loads including lights, air conditioners, water proof device, and the like, which are mounted in the aircraft.

The CSD 22A forms a driving power transmission path 211A which transmits the rotational driving power of the low-pressure shaft 66 (the rotary shaft of the engine 60 which is not shown in FIG. 2) to the electric generator 20A. The toroidal CVT 31A constitutes a part of the driving power transmission path 211A. The driving power transmission path 211A includes an input path 23A connecting the rotary shaft of the engine 60 to the toroidal CVT 31A, and an output path 24A connecting the toroidal CVT 31A to a generator shaft 201. The input path 23A and the output path 24A include members (e.g., shafts and gears) for rotationally transmitting the driving power.

The CSD 22A drives the electric generator 20A based on the rotational driving power of the low-pressure shaft 66 (not shown in FIG. 2) at a constant speed. In the electric power generation apparatus 10A, the rotational driving power from the low-pressure shaft 66 is input to the toroidal CVT 31A via the input path 23A. Then, the toroidal CVT 31A changes the rotational driving power, and then outputs the rotational driving power to the generator shaft 201 via the output path 24A. When the generator shaft 201 rotates, the electric generator 20A generates AC power with a frequency which is proportional to the rotation speed of the generator shaft 201. A transmission ratio (transmission gear ratio) of the toroidal CVT 31A is continuously changed to maintain the rotation speed of the generator shaft 201 at a proper value (value corresponding to a frequency (e.g., 400 Hz) that is suitable for actuation of electric components within the aircraft) irrespective of a change in the rotation speed of the low-pressure shaft 66. This makes it possible to maintain the frequency at a constant proper value.

[Toroidal CVT]

As shown in FIG. 2, the toroidal CVT 31A includes a transmission input shaft 32A, a transmission output shaft 34A, input discs 35a, 36a, output discs 35b, 36b, power rollers 35c, 36c, trunnions 35d, 36d, and a clamping mechanism 37.

The transmission input shaft 32A and the transmission output shaft 34A are placed coaxially on a transmission axis line P1. The input discs 35a, 36a are provided on the transmission input shaft 32A in such a manner that the input discs 35a, 36a are rotatable together with the transmission input shaft 32A. The output discs 35b, 36b are provided on the transmission output shaft 34A in such a manner that the output discs 35b, 36b are rotatable together with the transmission output shaft 34A.

The first input disc 35a which is one of the input discs 35a, 36a and the first output disc 35b which is one of the output discs 35b, 36b form a pair. The first input disc 35a and the first output disc 35b face each other in the extension direction of the transmission axis line P1 and form a first cavity 35. The first cavity 35 is defined by a surface 35e of the first input disc 35a and a surface 35f of the first output disc 35b, the surface 35e and the surface 35f facing each other. The first cavity 35 has an annular shape which is continuous in a circumferential direction, in a radially outward region of the transmission input shaft 32A and the transmission output shaft 34A.

In the same manner, the second input disc 36a which is the other of the input discs 35a, 36a and the second output disc 36b which is the other of the output discs 35b, 36b form a pair. The second input disc 36a and the second output disc 36b face each other in the extension direction of the transmission axis line P1 and form a second cavity 36. The second cavity 36 is defined by a surface 36e of the second input disc 36a and a surface 36f of the second output disc 36b, the surface 36e and the surface 36f facing each other. The second cavity 36 has an annular shape which is continuous in the circumferential direction, in a radially outward region of the transmission input shaft 32A and the transmission output shaft 34A.

In the present embodiment, the toroidal CVT 31A has a double-cavity configuration. The toroidal CVT 31A includes the first cavity 35, the second cavity 36, two first power rollers 35c, and two second power rollers 36c. These cavities 35, 36 are arranged in parallel at a predetermined distance between them along the extension direction of the transmission input shaft 32A and the transmission output shaft 34A. Note that the toroidal CVT 31A is not limited to a toroidal CVT with the double-cavity configuration, and may include three or more cavities. The first power rollers 35c are disposed within the first cavity 35. The second power rollers 36c are disposed within the second cavity 36.

In the present embodiment, the toroidal CVT 31A has a center input configuration. The two input discs 35a, 36a are disposed back-to-back on the transmission input shaft 32A. The members forming the downstream end of the input path 23A are secured onto the transmission input shaft 32A and disposed between the two input discs 35a, 36a. The transmission output shaft 34A is inserted into the transmission input shaft 32A with a hollow structure (space). The transmission output shaft 34A includes two protruding parts 351, 361 protruding from the transmission input shaft 32A. The first output disc 35b is provided at the first protruding part 351 and faces the first input disc 35a. The second output disc 36b is provided at the second protruding part 361 and faces the second input disc 36a.

The first power rollers 35c are disposed to be substantially spaced apart from each other in the circumferential direction within the first cavity 35. First trunnions 35d correspond to the first power rollers 35c in a one-to-one correspondence. The first trunnions 35d are supported by the casing 21 in such a manner that the first trunnions 35d are rotatable around tilt motion axis lines P2 and displaceable in the extension direction of the tilt motion axis lines P2. The first power rollers 35c are supported by the first trunnions 35d, respectively in such manner that the first power rollers 35c are rotatable around rolling motion axis lines P3, respectively. The first power rollers 35c are disposed within the first cavity 35 in a state in which the first power rollers 35c are displaceable in the extension direction of the tilt motion axis lines P2, rotatable (tiltable, revolvable) around the tilt motion axis lines P2, and rotatable (rotatable around their axes) around the rolling motion axis lines P3. The first power rollers 35c are configured to contact the surface 35e of the first input disc 35a and the surface 35f of the first output disc 35b.

The layout of the second power rollers 36c within the second cavity 36, the configuration in which the second trunnions 36d are supported by the casing 21, the configuration in which the second power rollers 36c are supported by the second trunnions 36d, the rotation directions of the second power rollers 36c and the second trunnions 36d, and the like are similar to those described above, and description of them is omitted.

The clamping mechanism 37 is a cam-driven clamping mechanism. The clamping mechanism 37 includes a first cam disc 37a having a first cam surface 37b, a second cam disc 37c having a second cam surface 37d facing the first cam surface 37b in the axial direction of the transmission axis line P1, a plurality of rollers 37e sandwiched between the cam surfaces 37b, 37d in a state in which the rollers 37e are held in a holder 37f, and a pushing element 37g. In the center input configuration, the first cam disc 37a is provided at the first protruding part 351 of the transmission output shaft 34A. The first output disc 35b also serves as the second cam disc 37c. The second cam surface 37d is provided on the back surface of the first output disc 35b. The pushing element 37g is provided at the second protruding part 361. The first cam surface 37b and the second cam surface 37d have a shape in which concave and convex portions are alternately arranged in the circumferential direction.

When the first output disc 35b rotates, a circumferential position of the first cam surface 37b with respect to the second cam surface 37d is deviated, and the rollers 37e moved onto the convex portion of the first cam surface 37b push the first output disc 35b toward the first input disc 35a. This causes the first power rollers 35c between the first input disc 35a and the first output disc 35b to be pushed against these discs 35a, 35b. Simultaneously, the first cam disc 37a pushes the first protruding part 351 to a side opposite to a side to which the first output disc 35b is pushed. The second protruding part 361 and the pushing element 37g operate in response to this. The pushing element 37g pushes the second output disc 36b toward the second input disc 36a. This causes the second power rollers 36c between the second input disc 36a and the second output disc 36b to be pushed against these discs 36a, 36b.

In the center input configuration, the output path 24A includes an extended shaft 362 placed coaxially with the transmission output shaft 34A, and the extended shaft 362 is joined to one of the protruding parts 351, 361 (e.g., second protruding part 361) via a dog clutch 363. Even in a case where the transmission output shaft 34A is displaced in the extension direction of the transmission axis line P1 by the action of the clamping mechanism 37, the driving power is transmitted from the transmission output shaft 34A to the extended shaft 362 via the dog clutch 363.

The electric power generation apparatus 10A has a series configuration. The driving power transmission path 211A of the CSD 22A does not include a path which bypasses the toroidal CVT 31A. However, one or more auxiliary devices 15 of the electric power generation apparatus 10A, such as the hydraulic pump 330 are driven by the rotational driving power taken out of the input path 23A or the output path 24A.

The input path 23A includes an electric power generation apparatus input shaft 231 to which the rotational driving power of the low-pressure shaft 66 (rotary shaft of the engine 60) is input, and an input gear 232 which transmits the rotation of the electric power generation apparatus input shaft 231 to the toroidal CVT 31A. The input gear 232 includes a driving gear 233 provided at the electric power generation apparatus input shaft 231 and a driven gear 234 which is provided at the electric power generation apparatus input shaft 231 and is in mesh with the driving gear 233. The electric power generation apparatus input shaft 231 is parallel to the transmission axis line P1 and the input gear 232 is a parallel shaft gear pair.

The output path 24A includes an output gear 241 which transmits the rotation output from the toroidal CVT31A to the generator shaft 201. The generator shaft 201 is parallel to the transmission axis line P1. The output gear 241 is a parallel shaft gear train. In the center input configuration, the output gear 241 includes a driving gear 242 provided at the extended shaft 362, a driven gear 243 provided at the generator shaft 201, and one or more (e.g., two) idle gears 244, 245 which transmit the rotation of the driving gear 242 to the driven gear 243.

Hereinafter, contact regions between the power rollers 35c, 36c and the surfaces 35e, 36e will be referred to as "input side contact regions", contact regions between the power rollers 35c, 36c and the surfaces 35f, 36f will be referred to as "output side contact regions", a distance from the transmission axis line P1 to each of the input side contact regions will be referred to as "input side contact region radius rin", a distance from the transmission axis line P1 to each of the output side contact regions will be referred to as "output side contact region radius rout", and a ratio of the input side contact region radius rin to the output side contact region radius rout will be referred to as "radius ratio" (radius ratio=rin/out). Positions of the power rollers 35c, 36c in the extension direction of the tilt motion axis lines P2 will be referred to as "roller positions X". Rotation angles of the power rollers 35c, 36c around the tilt motion axis lines P2 will be referred to as "tilt motion angles φ".

The clamping mechanism 37 is provided at the rear side of the second output disc 36b. The clamping mechanism 37 functions as an axial force generation mechanism which generates a pushing force for pushing the first power rollers 35c and the second power rollers 36c. The oil is supplied from the casing 21 to the surfaces of the power rollers 35c, 36c as the traction oil. The clamping mechanism 37 generates a clamping force (pushing force) in the extension direction of the transmission axis line P1. The clamping force pushes the first power rollers 35c against the first input disc 35a and the first output disc 35b. The clamping force of the clamping mechanism 37 also pushes the second power rollers 36c against the second input disc 36a and the second output disc 36b.

Thus, an oil film (membrane) with a high viscosity is formed on the input side contact regions and the output side contact regions. This allows the toroidal CVT 31A to transmit the rotation of the transmission input shaft 32A to the transmission output shaft 34A by the traction drive. When the transmission input shaft 32A rotates, the input discs 35a, 36a rotate together with the transmission input shaft 32A. The power rollers 35c, 36c are driven to rotate around the rolling motion axis lines P3 by the shear resistance of the oil film generated in the input side contact regions. With the rotation of the power rollers 35c, 36c around the rolling motion axis lines P3, the output discs 35b, 36b are driven to rotate by the shear resistance of the oil film generated in the output side contact regions. The transmission output shaft 34A rotates together with the output discs 35b, 36b.

Since the clamping mechanism 37 is cam-driven clamp (cam clamp) as described above, the clamping mechanism 37 is provided at the rear side (location where the driving powers at the output side merge) of the second output disc 36b to generate a clamping force proportional to the torque. In a case where the clamping mechanism 37 is hydraulically powered (hydraulic clamp), the clamping mechanism 37 may be provided at the rear side of the second output disc 36b as in the cam-driven clamping mechanism. However, the clamping mechanism 37 may be provided at the front side of the first input disc 35b.

The transmission ratio (transmission gear ratio) of the toroidal CVT 31A is a ratio of the rotation speed NCVTout of the output discs 35b, 36b to the rotation speed NCVTin of the input discs 35a, 36a, and is equal to the above-described radius ratio (transmission ratio=NCVTout/NCVTin=rin/rout). The transmission ratio is continuously changed in response to the tilt motion angles φ. The tilt motion angles φ continuously change in response to the roller positions X. When the roller positions X are changed, a side slip occurs in the power rollers 35c, 36c. The power rollers 35c, 36c rotate around the tilt motion axis lines P2 until the side slip is ceased, and thus the tilt motion angles φ are changed. With the change in the tilt motion angles φ, the input side contact regions and the output side contact regions are displaced on the surfaces 35e, 36e on the input side and the surfaces 35f, 36f on the output side, so that the input side contact region radiuses rin and the output side contact region radiuses rout are continuously changed. In this way, the radius ratio, and hence the transmission ratio of the toroidal CVT 31A are continuously changed.

[Hydraulic Actuator]

Figure 3:
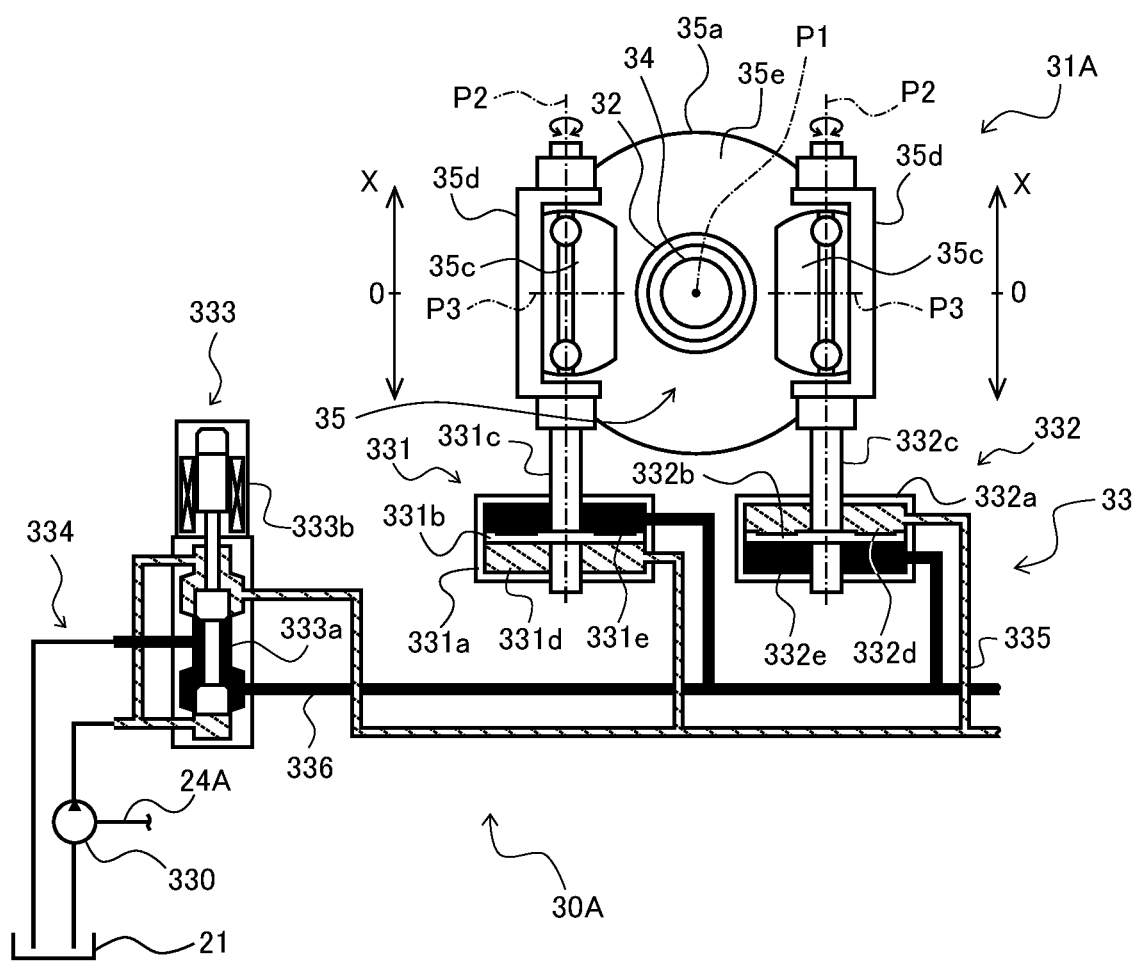
FIG. 3 is a schematic view showing an example of the configuration of a hydraulic servo system included in the electric power generation apparatus for the aircraft of FIG. 2.

As shown in FIG. 3, the toroidal CVT 31A includes a hydraulic servo system 33 as a hydraulic circuit which adjusts the positions of the power rollers 35c, 36c. The hydraulic servo system 33 includes a first hydraulic cylinder 331, a second hydraulic cylinder 332, a servo valve 333, an oil supply line 334, and oil passages 335, 336, and the like. These constituents construct a hydraulic actuator. Although FIG. 3 shows only a configuration in which the hydraulic servo system 33 is connected to the first power rollers 35c for easier understanding of the description, the hydraulic servo system 33 is also connected to the second power rollers 36c in the same manner.

The hydraulic cylinders 331, 332 correspond to the trunnions 35d, 36d, and the power rollers 35c, 36c supported by the trunnions 35d, 36d, in a one-to-one correspondence. The servo valve 333 includes a spool valve 333a including a spool, and a valve driving section 333b which adjusts the position of the spool by sliding the spool.

As shown in FIG. 3, the roller positions X are changed by the hydraulic servo system 33 and thus the tilt motion angles φ and the transmission ratio are adjusted. In the hydraulic servo system 33, a hydraulic pump 330 is driven at a constant speed by the rotational driving power taken out of the output path 24A of the CSD 22A, and discharges the oil from the casing 21. The hydraulic pump 330 is connected to the servo valve 333 of the hydraulic servo system 33 via the oil supply line 334. The hydraulic pump 330 supplies the oil from the casing 21 as the hydraulic oil for the hydraulic servo system 33.

The hydraulic cylinder 331 includes a piston body 331a, a piston 331b, and a rod 331c. The hydraulic cylinder 332 includes a piston body 332a, a piston 332b, and a rod 332c. The interior of the piston body 331a is separated by the piston 331b into a speed increase oil chamber 331d and a speed reduction oil chamber 331e. The interior of the piston body 332a is separated by the piston 332b into a speed increase oil chamber 332d and a speed reduction oil chamber 332e. The rods 331c, 332c are placed coaxially with the tilt motion axis lines P2, respectively. The rod 331c couples the piston 331b to the trunnion 35d, and is movable in the extension direction of the tilt motion axis line P2 together with the trunnion 35d. The rod 332c couples the piston 332b to the trunnion 36d, and is movable in the extension direction of the tilt motion axis line P2 together with the trunnion 36d.

The servo valve 333 includes a spool valve 333a including a spool, and a valve driving section 333b which adjusts the spool position. All of the speed increase oil chambers 331d, 332d are connected to a speed increase port of the spool valve 333a, via an oil passage 335. All of the speed reduction oil chambers 331e, 332e are connected to a speed reduction port of the spool valve 333a via an oil passage 336. The valve driving section 333b adjusts the back pressure of the spool in response to a driving signal provided by a control unit which is not shown, to displace the spool.

When the hydraulic oil is supplied to the oil passage 335, the oil is supplied to the speed increase oil chambers 331d, 332d of the hydraulic cylinders 331, 332, and is discharged from the speed reduction oil chambers 331e, 332e of the hydraulic cylinders 331, 332 via the oil passage 336. With this oil flow, the pistons 331b, 332b are advanced and retracted inside the piston bodies 331a, 332a, and correspondingly, the rods 331c, 332c are advanced and retracted. Therefore, the roller positions X and the tilt motion angles φ are changed so that the transmission ratio is increased. When the oil flows in an opposite direction, the roller positions X and the tilt motion angles φ are changed so that the transmission ratio is reduced.

In the above-described manner, the servo valve 333 controls the flow rates and pressures of the hydraulic oil supplied to the speed increase oil chambers 331d, 332d and the speed reduction oil chambers 331e, 332e, and thus the roller positions X, the tilt motion angles φ, and the transmission ratio are adjusted. Therefore, in the toroidal CVT 31A, in a case where the hydraulic servo system 33 receives an operation command from a control unit which is not shown, the roller positions X and the tilt motion angles φ of the four power rollers 35c, 36c are adjusted so that the radius ratios become an equal value corresponding to an operation command value.

[Exemplary Configuration of Synchronous Power-On/Off Controller]

Next, an example of a synchronous power-on/off controller applied to the electric power generation apparatus 10A with the above-described configuration, and a synchronous power-on/off control system including the electric power generation apparatus 10A and the synchronous power-on/off controller will be specifically described with reference to FIG. 4.

Figure 4:
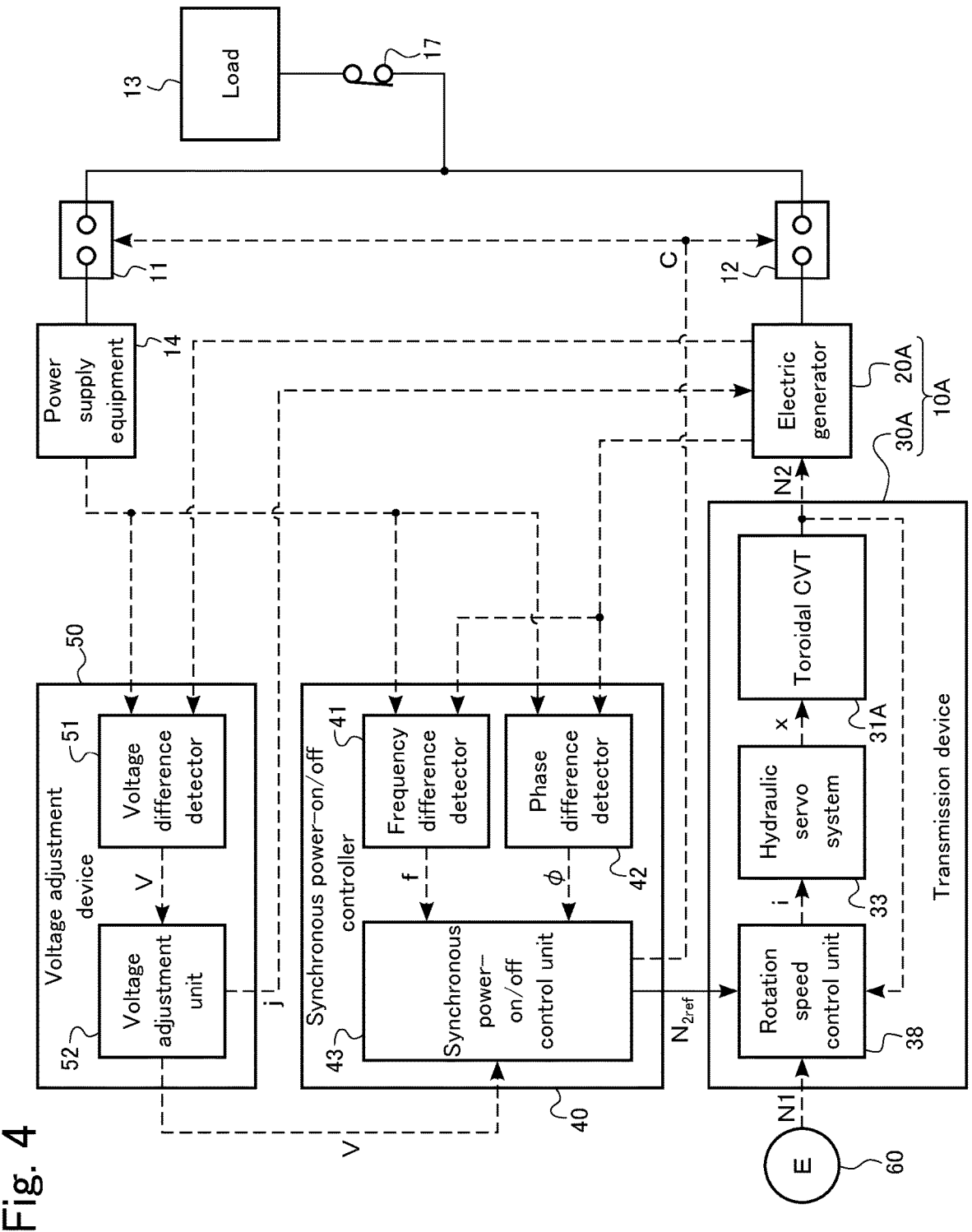
FIG. 4 is a schematic block diagram showing an example of the configuration of the synchronous power-on/off controller applied to the electric power generation apparatus for the aircraft of FIG. 2.

As shown in FIG. 4, as electric power supply sources for the aircraft, two electric power supply sources which are the above-described electric power generation apparatus 10A and power supply equipment 14 such as an external ground power unit (GPU). The power supply equipment 14 is connected to a load 13 (devices within the aircraft) within the aircraft via a first breaker 11, while the electric power generation apparatus 10A is connected to the load 13 via a second breaker 12. In the configuration of FIG. 4, a contact 17 is provided between the load 13, and the first and second breakers 11, 12. Inputting/outputting control commands is performed between the power supply equipment 14 and the electric power generation apparatus 10A, and a synchronous power-on/off controller 40 and a voltage adjustment device 50 (see broken-line arrows).

In brief, the synchronous power-on/off control system of the present embodiment, include the power supply equipment 14 and the electric power generation apparatus 10A, as the electric power supply sources which are mutually switched, and the first breaker 11 and the second breaker 12 as switching devices for these two electric power supply sources. Further, the synchronous power-on/off control system includes the synchronous power-on/off controller 40 and the voltage adjustment device 50.

As described above, the electric power generation apparatus 10A includes the electric generator 20A and the transmission device 30A. The transmission device 30A includes a rotation speed control unit 38 in addition to the toroidal CVT 31A and the hydraulic servo system 33 described above. Note that the detailed configuration of the toroidal CVT 31A shown in FIG. 2 is not directly related to the synchronous power-on/off control system and therefore is not shown in FIG. 4.

The rotation speed control unit 38 generates a servo valve opening rate command i based on an engine speed N1 which is the output rotation speed of the engine 60, a command provided by the synchronous power-on/off controller 40 which will be described later, and a generator drive rotation speed N2 of the toroidal CVT 31A. The generated servo valve opening rate command i is input to the hydraulic servo system 33. The hydraulic servo system 33 adjusts the opening rate of the servo valve 333 which is not shown in FIG. 4, in response to the input servo valve opening rate command i. This changes the flow rate of the hydraulic oil flowing through the servo valve 333. This flow rate is input to the toroidal CVT 31A as a stroke command x.

In the toroidal CVT 31A, the first hydraulic cylinder 331 and the second hydraulic cylinder 332 (not shown in FIG. 4) of the hydraulic servo system 33 operate in response to the hydraulic oil with the flow rate corresponding to the input stroke command x. As described above, the piston 331b of the first hydraulic cylinder 331 is coupled to the trunnion 35d of the toroidal CVT 31A via the rod 331c, and the piston 332b of the second hydraulic cylinder 332 is coupled to the trunnion 36d of the toroidal CVT 31A via the rod 332c. In this configuration, the tilt motion angles θ of the first power rollers 35c and the tilt motion angles θ of the second power rollers 36c are adjusted, so that the transmission ratio (transmission gear ratio) of the toroidal CVT 31A is controlled. The electric generator 20A is driven at the changed generator drive rotation speed N2 of the toroidal CVT 31A. The changed generator drive rotation speed N2 is fed back to the rotation speed control unit 38. In this way, the output frequency of the electric generator 20A is controlled to become a constant value (constant frequency control).

The voltage adjustment device 50 is connected to the power supply equipment 14 and the electric generator 20A. The voltage adjustment device 50 includes a voltage difference detector 51 and a voltage adjustment unit 52. The voltage difference detector 51 detects a supply voltage from the power supply equipment 14 and a supply voltage from the electric generator 20A, and calculates a difference (voltage difference) V between these supply voltages. The detected voltage difference V is provided to the voltage adjustment unit 52. The voltage adjustment unit 52 provides the voltage difference V to the synchronous power-on/off controller 40 which will be described later, and provides a field current command j corresponding to the voltage difference V to the electric generator 20A. In this way, the supply voltage (output voltage) of the electric generator 20A is controlled at a constant value (constant voltage control).

The synchronous power-on/off controller 40 of the present embodiment includes a frequency difference detector 41, a phase difference detector 42, and a synchronous power-on/off control unit 43. The frequency difference detector 41 detects a frequency difference f between the power supply equipment 14 and the electric generator 20A. In the present embodiment, initially, the frequency difference detector 41 converts an AC voltage waveform of the power supply equipment 14 and an AC voltage waveform of the electric generator 20A into rectangular (square) waves, respectively, and measures time of one cycle of each of these rectangular waves. Then, the frequency difference detector 41 detects the output frequency of the power supply equipment 14 and the output frequency of the electric generator 20A, and thus detects the frequency difference f.

The phase difference detector 42 detects a phase difference φ between the power supply equipment 14 and the electric generator 20A. In the present embodiment, the phase difference detector 42 converts the AC voltage difference of the power supply equipment 14 and the AC voltage difference of the electric generator 20A into rectangular (square) waves, respectively, and detects the phase difference φ by measuring a rising time difference between these rectangular waves.

Figure 5:
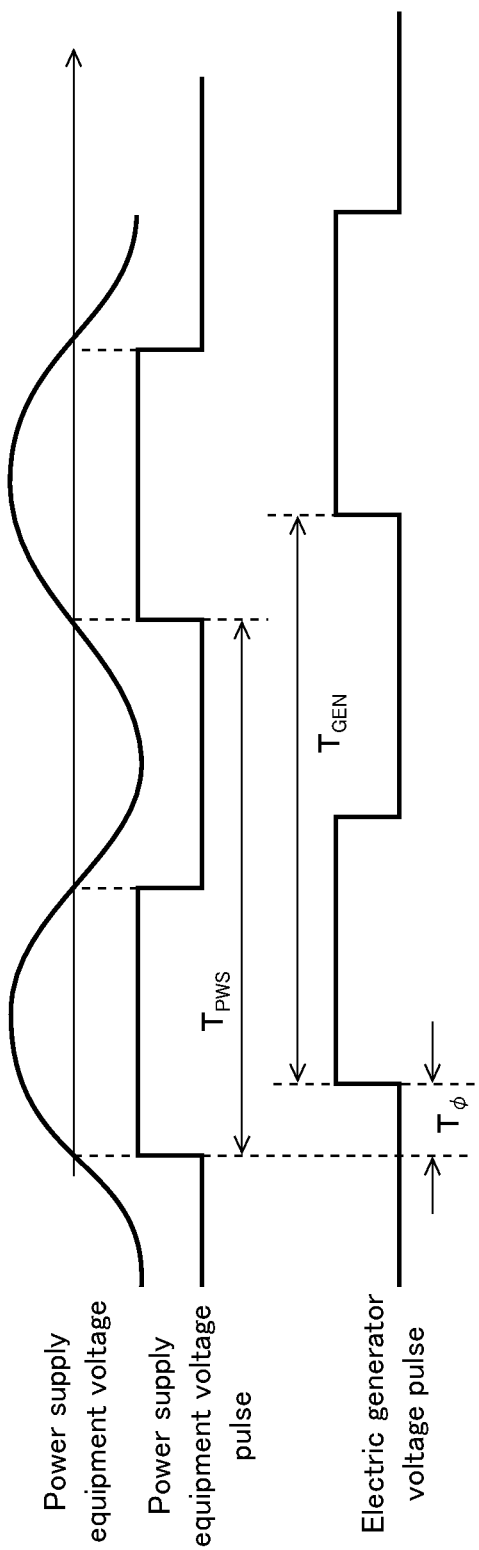
FIG. 5 is a voltage waveform showing a method for detecting a phase difference from voltage pulses of electric power supply sources, which is performed by the synchronous power-on/off controller of FIG. 4.

More specifically, the phase difference detector 42 measures of the voltage pulse of the power supply equipment 14 and the voltage pulse of the electric generator 20A. As shown in FIG. 5, the phase difference detector 42 measures cycles based on voltage zero cross points, and calculates the frequency difference f based on the cycles according to the following formulas (1) to (3). $f_{PWS}$ (unit: Hz) indicates the frequency of the power supply equipment 14. $f_{GEN}$ (unit: Hz) indicates the frequency of the electric generator 20A. $T_{PWS}$ indicates the cycle of the power supply equipment 14. $T_{GEN}$ indicates the cycle of the electric generator 20A.

$$f = f_{GEN} - f_{PWS} \quad (1)$$

$$f_{PWS} = (1/T_{PWS}) \quad (2)$$

$$f_{GEN} = (1/T_{GEN}) \quad (3)$$

Note that the voltage pulse of the power supply equipment 14 and the voltage pulse of the electric generator 20A may be obtained from the voltage adjustment device 50, or from the power supply equipment 14 and the electric generator 20A via a voltage detector which is not shown.

The phase difference detector 42 calculates the phase difference φ (unit: degree) according to the following formula (4) or (5), under the condition in which the phase of the power supply equipment 14 is a reference. The formula (4) is a calculation formula for a case where $T_φ < (T_{PWS}/2)$. The formula (5) is a calculation formula for a case where $T_φ ≥ (T_{PWS}/2)$. In the formula (4) and the formula (5), a case where the phase of the electric generator 20A is delayed is "positive side".

$$φ = 360 \times (T_φ/T_{PWS}) \quad (4)$$

$$φ = 360 - 360 \times (T_φ/T_{PWS}) \quad (5)$$

The detected frequency difference f and phase difference φ are provided to the synchronous power-on/off control unit 43. The synchronous power-on/off control unit 43 calculates a generator rotation speed command N2ref based on the frequency difference f and the phase difference φ, and provides the generator rotation speed command N2ref to the rotation speed control unit 38 of the transmission device 30A. The synchronous power-on/off control unit 43 determines whether or not the voltage difference V provided by the voltage adjustment unit 52, the detected frequency difference f, and the detected phase difference φ are within the predetermined ranges, respectively.

In a case where all of the voltage difference V, the detected frequency difference f, and the detected phase difference φ are within the predetermined ranges, respectively, the synchronous power-on/off control unit 43 outputs a power-on command C1 to the breaker on the electric power supply source side (load side) where the electric power supply source is connected to the load 13, of the first breaker 11 and the second breaker 12, while a power-off command C2 is output to the breaker on the electric power supply source side (no-load side) where the electric power supply source is not connected to the load 13, of the first breaker 11 and the second breaker 12. For example, in a case where the aircraft is connected to the power supply equipment 14, the second breaker 12 connected to the electric generator 20A is the breaker on the no-load side, and the first breaker 11 connected to the power supply equipment 14 is the breaker on the load side. Therefore, the synchronous power-on/off control unit 43 outputs the power-on command C1 to the second breaker 12 and the power-off command C2 is output to the first breaker 11.

In a case where the power-on command C1 is output to the first breaker 11, the power-off command C2 is output to the second breaker 12. In a case where the power-on command C1 is output to the second breaker 12, the power-off command C2 is output to the first breaker 11. Since the power-on command C1 and the power-off command C2 have an obverse-reverse relation in this way, the power-on command C1 and the power-off command C2 will be collectively referred to as "power-on/off command C" (see FIG. 4).

[Exemplary Synchronous Power-On/OFF Control Method]

Next, an exemplary synchronous power-on/off control method performed by the synchronous power-on/off controller 40 with the above-described configuration will be specifically described with reference to FIGS. 6 and 7.

Initially, the synchronous power-on/off control unit 43 of the synchronous power-on/off controller 40 determines whether or not the detected phase difference φ is smaller than a preset upper limit value (φa and larger than a lower limit value φb, i.e., whether or not the detected phase difference φ is within the predetermined range (φb<φ<(φa) (step S1).

In a case where the phase difference φ falls outside the predetermined range (the phase difference φ is equal to or larger than the upper limit value φa (φ≥φa) or equal to or less than the lower limit value φb (φ≤φb), "NO" in step S01), the synchronous power-on/off control unit 43 determines that the phase difference φ does not meet a synchronous power-on/off condition, and adds a predetermined offset β to a constant rotation speed command ("rated rotation speed")α.

The synchronous power-on/off control unit 43 calculates a generator rotation speed command $N_{2ref}$ by addition of the offset β, and provides the generator rotation speed command $N_{2ref}$ to the rotation speed control unit 38 (step S02). In this way, the synchronous power-on/off control unit 43 performs control so that the inclination angle of the phase difference φ is positively (actively) reduced as indicated by "frequency difference offset control" range (hatched range in FIG. 7) in FIG. 7. Since the inclination angle of the phase difference φ is reduced, the synchronous power-on/off control unit 43 can perform the control to prevent a situation in which the change in the phase difference φ stagnates outside the predetermined range.

Although in the above-described example, the offset β is added to the rated rotation speed α to prevent a situation in which the change in the phase difference φ stagnates, the present invention is not limited to this. For example, the offset β may be subtracted from the rated rotation speed α.

On the other hand, in a case where the phase difference φ is within the predetermined range (φb<φ<φa), "YES" in step S01), the synchronous power-on/off control unit 43 determines that the phase difference φ meets the synchronous power-on/off condition, because the phase difference φ is within the predetermined range (φb<φ<φa). Then, the synchronous power-on/off control unit 43 calculates the generator rotation speed command $N_{2ref}$ by adding to the rated rotation speed α, a value obtained by multiplying a control gain $K_{FB}$ and an integral value of the control gain $K_{FB}$, by the phase difference φ. The synchronous power-on/off control unit 43 provides the calculated generator rotation speed command $N_{2ref}$ to the rotation speed control unit 38 (step S03). In this way, the synchronous power-on/off control unit 43 performs control so that the phase difference φ within the predetermined range becomes zero (φ=0) within the predetermined range, as indicated by "phase difference feedback control" range in FIG. 6.

Then, after step S02 or step S03, the synchronous power-on/off control unit 43 determines whether or not all synchronous power-on/off conditions including another synchronous power-on/off conditions are met (step S04). In a case where all synchronous power-on/off conditions are met ("YES" in step S04), the synchronous power-on/off control unit 43 outputs the power-on command C1 to one of the first breaker 11 and the second breaker 12, and outputs the power-off command C2 to the other of the first breaker 11 and the second breaker 12 (step S05). On the other hand, in a case where all synchronous power-on/off conditions are not met ("NO" in step S04), the synchronous power-on/off control unit 43 moves back to step S01, and continues the frequency difference offset control as necessary.

When the power-on/off commands C (the power-on command C1 and the power-off command C2) are output, one of the breakers (e.g., the second breaker 12) completes power-on, and the other breaker (e.g., the first breaker 11) completes power-off after unique switching time (e.g., about 50 msec) passes. In this way, switching is completed. Note that for a time period from when one of the breakers completes the power-on until the other breaker completes power-off, a state in which the electric power is supplied from both of the electric power supply sources ("parallel run state") is formed. After the switching is completed, the transmission device 30A performs the constant rotation speed control under no load state.

Although in the present embodiment, the offset β is set to a fixed value, the present invention is not limited to this. For example, the offset β may be changed stepwise, and the phase difference φ may be changed as gently as possible before shifting to the feedback control. In brief, the present invention may include a configuration in which the offset β is a variable value instead of the fixed value in the above-described synchronous power-on/off control method.

Figure 8:
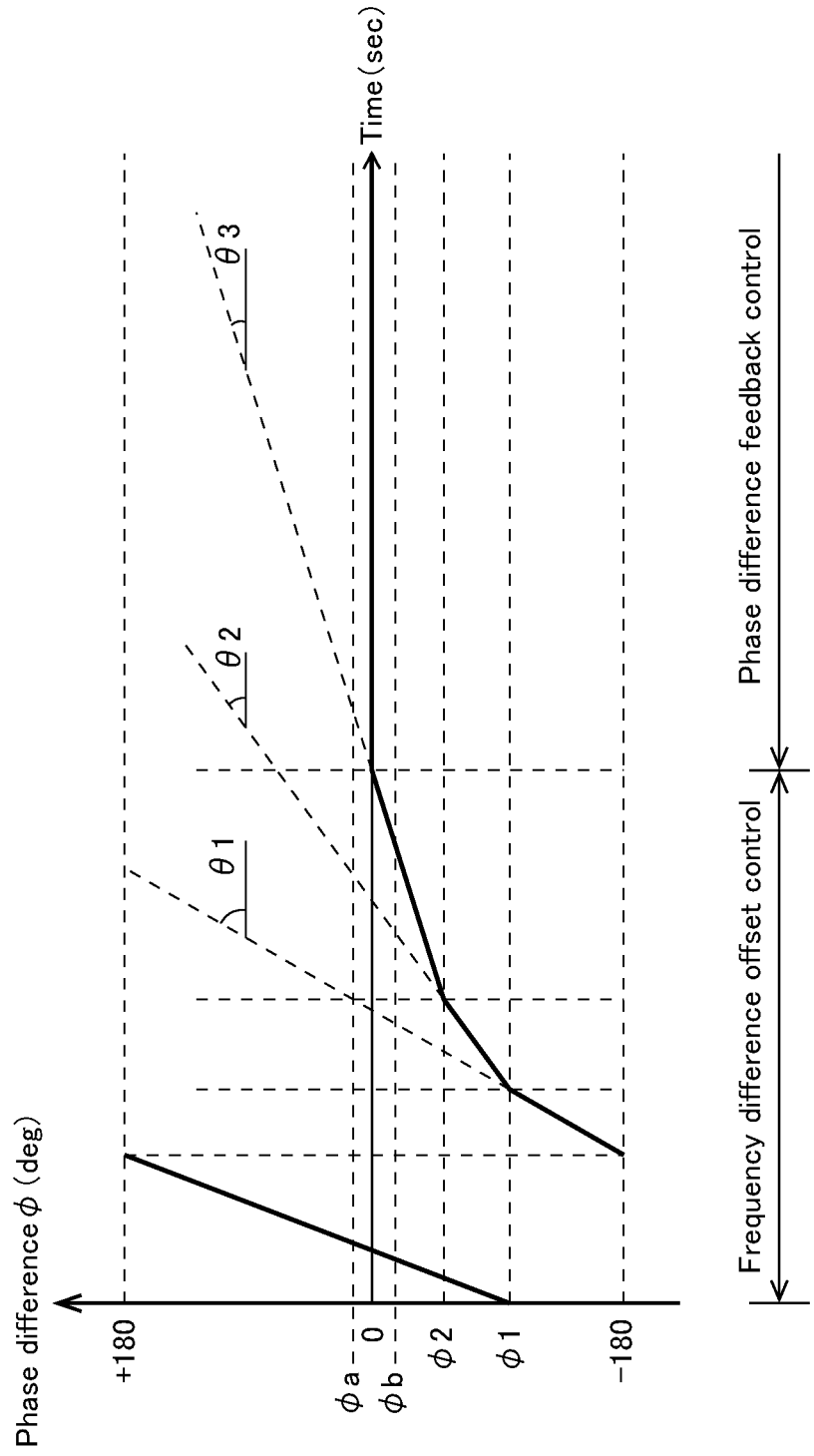
FIG. 8 is a graph showing a method of controlling the phase difference by variable offset in the synchronous power-on/off control method of FIG. 6.

For example, as shown in FIG. 8, initially, as the offset β, β=β1 that is an offset value for preparation of re-power-on/off is provided, and then the offset β is stepwisely reduced from β=β1 to β=β2, β3 ... (β1>β2>β3 ... ) so that the phase difference φ is stepwisely reduced. The value of the offset β which is stepwisely changed may be prepared as a value corresponding to the magnitude of the phase difference φ, or as a value corresponding to the magnitude of a slope (change amount) θ of the phase difference φ. The data of these values may be pre-stored in a memory (not shown) of the synchronous power-on/off control unit 43, in the form of a table.

Figure 6:
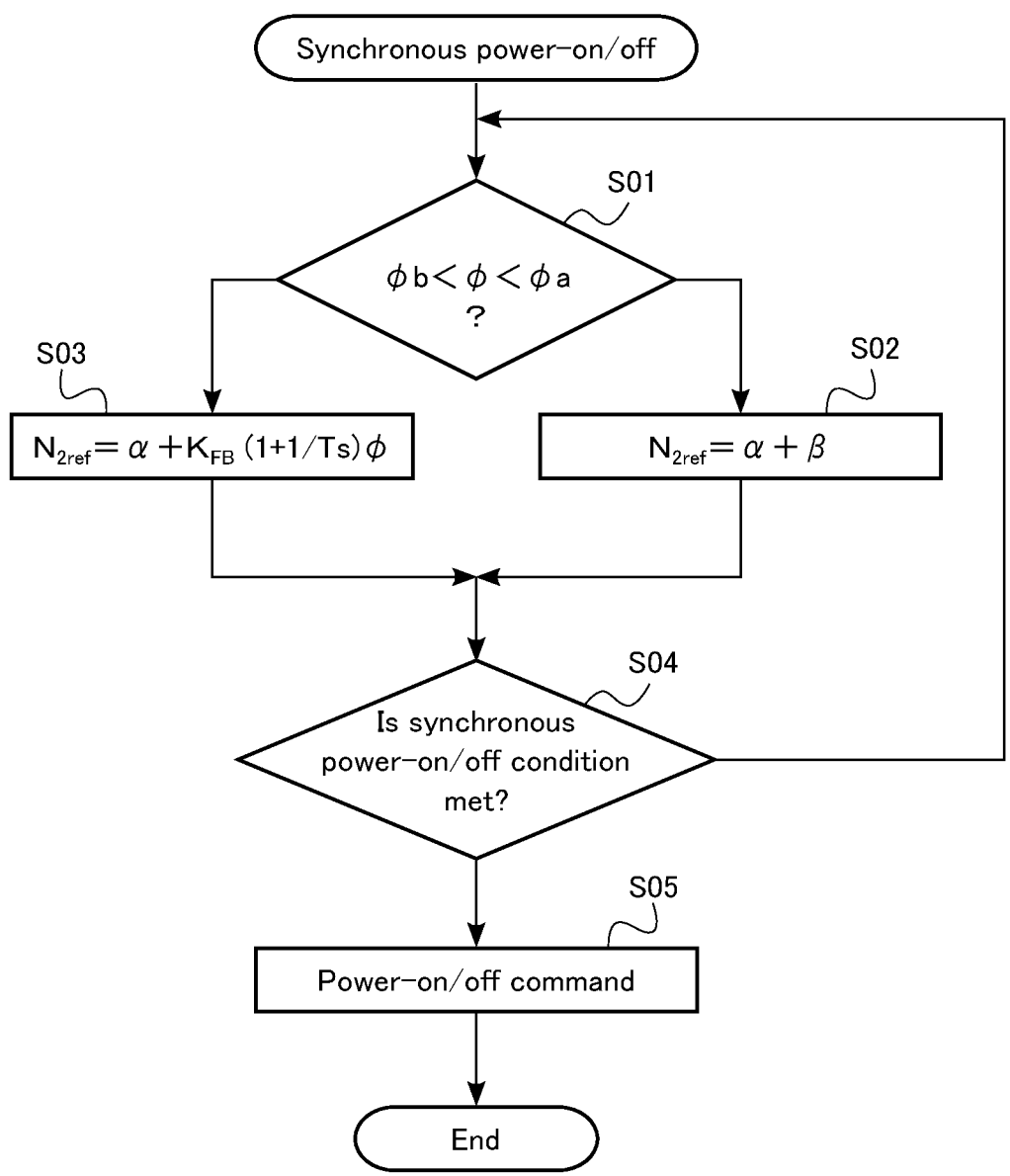
FIG. 6 is a flowchart showing an example of the synchronous power-on/off control method performed by the synchronous power-on/off controller of FIG. 4.
Figure 7:
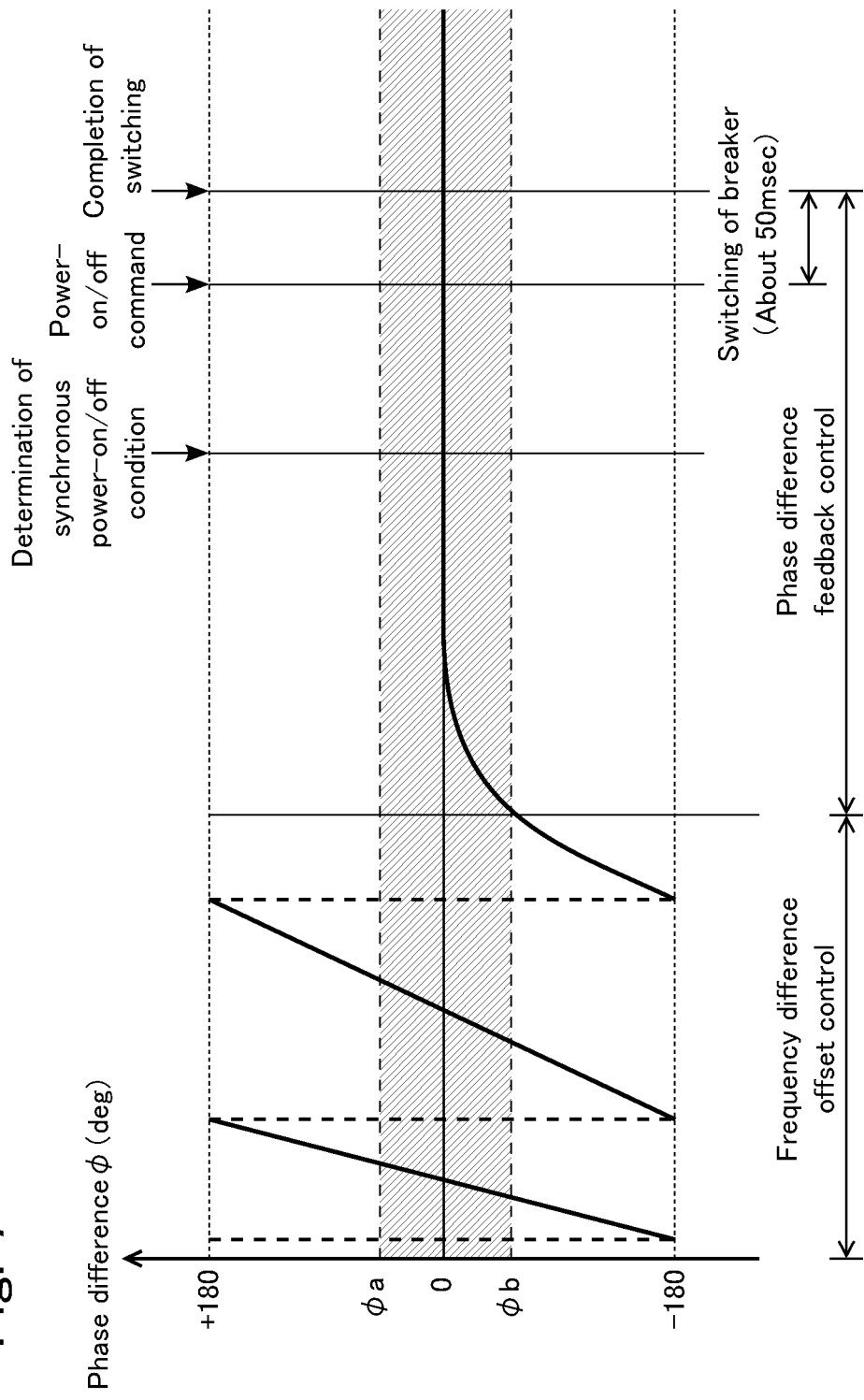
FIG. 7 is a graph showing a change over time of the phase difference controlled by the synchronous power-on/off control method of FIG. 6.

As described above, in the present embodiment, as shown in FIG. 7, the phase difference feedback control continues to be performed until the switching between the first breaker 11 and the second breaker 12 is completed. As shown in FIG. 6, in the synchronous power-on/off control method, while the phase difference φ is within the predetermined range, a proportional control (P control) is not performed, and a proportional-integral control (PI control) is performed (see step S03 in FIG. 6). Specifically, in a case where the frequency difference is within the predetermined range and the phase difference is within the predetermined range, the synchronous power-on/off control unit 43 calculates the generator rotation speed command $N_{2ref}$ by adding an output value obtained by subjecting the detected phase difference to the PI control to the rated rotation speed α (rotation speed command value of the transmission device 30A).

For the above-described reasons, the phase difference φ can be substantially maintained at zero (φ=0) even under the influence of disturbances. This makes it possible to maintain stable synchronous power-on/off conditions for a long period of time. In the synchronous power-on/off control system of the present embodiment, as shown in FIG. 2, the synchronous power-on/off control unit 43 and the rotation speed control unit 38 have intensive control functions. In this configuration, parameter adjustment, maintenance or the like can be made easier in design of the synchronous power-on/off control system.

In the present invention, even in a case where the conditions required for the synchronous power-on/off control are severe, it becomes easy to ensure a period for which the good and stable synchronous power-on/off conditions are maintained.

For example, in recent years, it has been demanded that switching (synchronous power-on/off) without instantaneous interruption (temporary blackout), between the electric power supply sources, be performed all the time after the landing of the aircraft. For example, in a case where the oil temperature is significantly decreased, for example, the ambience temperature in an environment in which the aircraft is located is lowered (lower temperature condition), the viscosity of the hydraulic oil used in the hydraulic cylinders 331, 332 in the hydraulic servo system 33 constituting the transmission device 30A is likely to be increased. If the spool of the servo valve 333 is excessively cooled due to a low temperature, the characteristics of the spool are changed, so that the hydraulic actuator including the hydraulic cylinders 331, 332, or the like cannot well operate.

If noises are accumulated in the hydraulic servo system 33, the phase difference φ is affected such that a great change in the phase difference φ continues and the phase difference φ does not change dynamically. In the synchronous power-on/off control, it is required that the phase difference φ be close to 0 (φ≈0), and be changing in a certain range (the above-described predetermined range). Since the phase difference φ is equal to an integral value of a frequency difference Δf, the change in the phase difference φ stagnates and the phase difference φ does not change dynamically, in a state in which the frequency difference Δf is not provided.

In the past, unlike these days, it was not required that the synchronous power-on/off be performed all the time. Therefore, even in a state in which the oil temperature is significantly decreased as described above, noises caused by this state can be reduced by warming-up the aircraft for a certain time. In other words, in the past, under a low-temperature condition, the switching without instantaneous interruption (temporary blackout) may be performed after a long standby time until the conditions are stabilized. In the past, by performing the P control in the phase difference feedback control, the phase difference φ is made as close to zero as possible. Although a slight offset occurs in the phase difference y in this case, the influence of an impact generated in the synchronous power-on/off can be sufficiently reduced.

However, to perform the synchronous power-on/off all the time, it becomes necessary to perform the switching without instantaneous interruption, after a long standby time until the conditions are stabilized, under, for example, a low-temperature condition. For this reason, the phase difference fluctuates depending on the time taken for the switching without instantaneous interruption to occur. In this case, if the synchronous power-on/off fails once, it takes time for the synchronous power-on/off to occur again. Under the circumstances, the requirements of the switching without instantaneous interruption all the time cannot be addressed.

In light of the above, in the present invention, the PI control is performed in the phase difference offset control (see step S03 in FIG. 6). With this control, the slight offset of the phase difference φ can be cancelled, and the phase difference φ can be made zero (the phase difference φ=0) (see FIG. 5). In this way, the phase difference φ=0 is positively realized. Unlike the conventional example, it becomes possible to quickly realize good synchronous power-on/off conditions without considering that the change in the phase difference φ stagnates, and more effectively suppress an impact generated in the synchronous power-on/off.

In the present embodiment, the phase difference φ=0 is realized in the phase difference feedback control. This can expand the predetermined range (φa>0>φb) of the phase difference φ, compared to the conventional method. In general, if the predetermined range of the phase difference φ is excessively expanded, the offset amount of the phase difference φ is increased, which increases a deviation of the phase difference φ. The fact that the deviation of the phase difference φ is increased means that the impact generated in the synchronous power-on/off is increased. For this reason, in the conventional method, the predetermined range of the phase difference φ is set to a narrowest possible range. On the other hand, in the present invention, the predetermined range of the phase difference φ can be expanded. Therefore, the phase difference feedback control can be continuously performed. This allows the phase difference φ to quickly converge at 0. For example, even in a situation in which the oil temperature is rapidly decreased, the synchronous power-on/off conditions can be quickly realized.

[Modified Example]

As described above, in the present embodiment, the voltage adjustment device 50 performs the constant voltage control, and then the synchronous power-on/off control unit 43 provides the power-on/off commands C to the first breaker 11 and the second breaker 12, in a case where the detected voltage difference, the frequency difference, and the phase difference are within the predetermined ranges, respectively. Thus, the synchronous power-on/off control method and the synchronous power-on/off controller according to the present invention can realize a voltage control function as well as a synchronous power-on/off control function. Because of the voltage control function, the synchronous power-on/off control and the voltage control can be well performed in an electric power system including a plurality of electric power supply sources. However, the present invention is not limited to this. The synchronous power-on/off control method and the synchronous power-on/off controller may not have the voltage control function. Therefore, in the present invention, the voltage adjustment device 50 is not an essential component.

In the present embodiment, the transmission device 30A includes the half toroidal CVT 31A with the double-cavity configuration, as the transmission mechanism. Since the half toroidal CVT 31A is highly responsive (is able to realize a quick response), the rotation speed of the electric generator 20A can be well adjusted even in a case where the engine speed of the engine 60 as the driving power source is changed. In addition, by using the synchronous power-on/off control according to the present invention, the generator drive rotation speed can be well feedback-controlled. This makes it possible to realize good synchronous power-on/off conditions in a shorter time. However, the present invention is not limited to this, and is applicable to known transmissions other than the half toroidal CVT with the double-cavity configuration.

Further, the specific configuration of the synchronous power-on/off controller 40 of the present embodiment, and the electric generator 20A, the transmission device 30A, the voltage adjustment device 50, the first breaker 11, the second breaker 12, the power supply equipment 14, and the like included in the synchronous power-on/off control system (control system with the configuration shown in FIG. 10) including the synchronous power-on/off controller 40, are not particularly limited, and various known configurations may be used. In the present invention, of course, the synchronous power-on/off control system may include components other than the electric generator 20A, the transmission device 30A, the synchronous power-on/off controller 40, the voltage adjustment device 50, the first breaker 11, the second breaker 12, and the power supply equipment 14 (e.g., see Embodiment 2 which will be described later).

Embodiment 2

In the above-described electric power generation apparatus 10A according to Embodiment 1, the predetermined range (φb<φ<φa) of the phase difference φ is set to the fixed value. However, the present invention is not limited to this. For example, the predetermined range of the phase difference φ may be changed according to a switching direction of the load 13. This configuration will be specifically described with reference to FIGS. 9 to 11.

In a state in which the external power supply equipment 14 is connected to the aircraft, there are two switching directions which are (1) a switching direction from the power supply equipment 14 to the electric generator 20A and (2) a switching direction from the electric generator 20A to the power supply equipment 14, as the switching direction of the load 13. Typically, at a time point when the synchronous power-on/off is performed, it is desired that the frequency on the load 13 side be lower and the phase on the load 13 side be delayed. This means that the synchronous power-on/off can be better performed by changing the predetermined range of the phase difference φ depending on the switching direction, as shown in FIG. 9.

Figure 9:
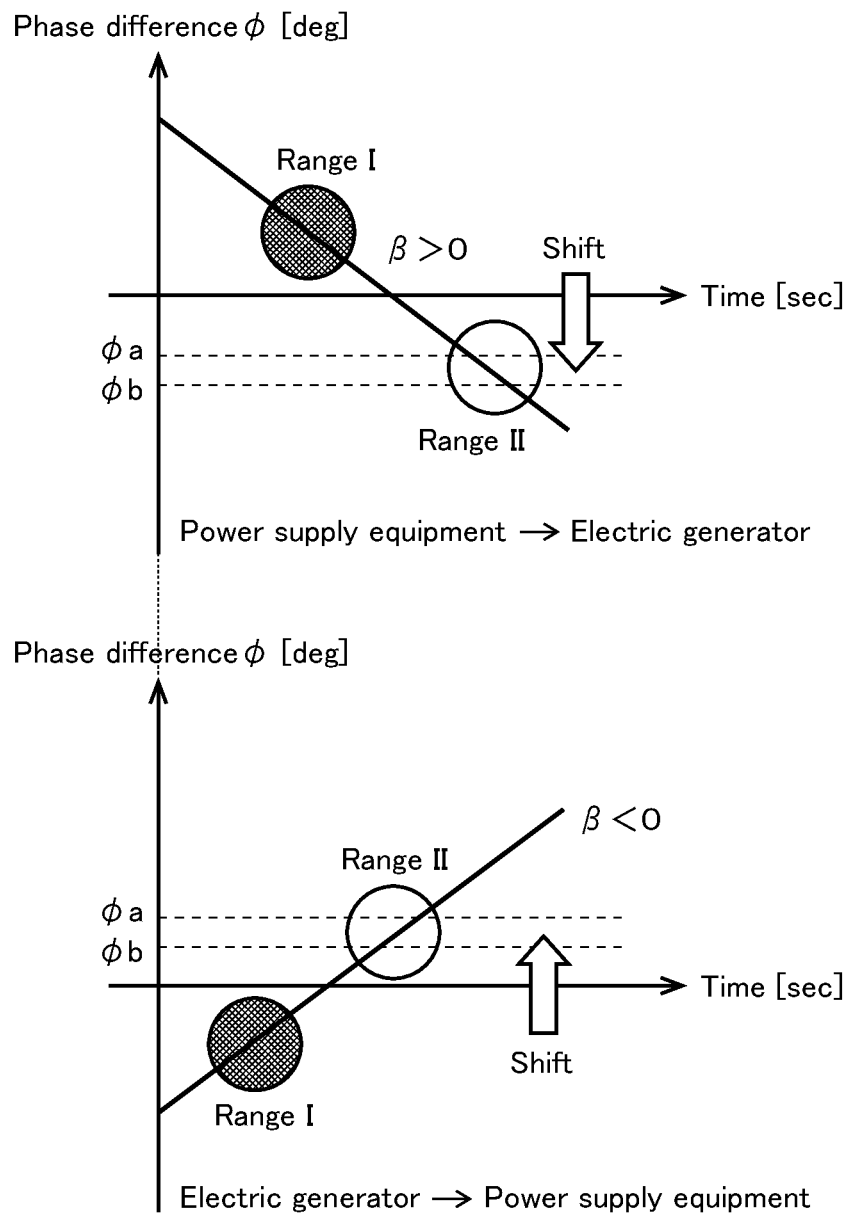
FIG. 9 is a graph for explaining a control which shifts the phase difference into a predetermined range, in a synchronous power-on/off control method and a synchronous power-on/off controller according to Embodiment 2 of the present invention.

At the upper side of FIG. 9, a shifting control for the phase difference in the (1) switching direction from the power supply equipment 14 to the electric generator 20A is shown. At the lower side of FIG. 9, a shifting control for the phase difference in the (2) switching direction from the electric generator 20A to the power supply equipment 14 is shown. In the examples shown in FIG. 9, frequency difference f[Hz]=generator frequency $f_{GEN}$[Hz]-power supply equipment frequency $f_{PWS}$ [Hz], and the phase difference φ is "positive" in a case where the phase of the electric generator 20A is delayed with respect to the phase of the power supply equipment 14.

As indicated by the upper side of FIG. 9 (corresponding to the (1) switching direction), in a case where the offset β is increased in a positive direction (β>0) with respect to the frequency of the power supply equipment 14, the slope of the phase difference φ increases in a reduction direction. On the other hand, as indicated by the lower side of FIG. 9 (corresponding to the (2) switching direction), in a case where the offset β is reduced in a negative direction (β<0) with respect to the frequency of the power supply equipment 14, the slope of the phase difference φ increases in an increase direction. Here, it is required that the frequency of the electric power supply source on the side (load side) where the electric power supply source is connected to the load 13 be lower than the frequency of the electric power supply source on the side (no load side) where the electric power supply source is not connected to the load 13. For this reason, in the (1) switching direction, the offset β is positive, while in the (2) switching direction, the offset β is negative.

A hatched (shaded) circular range I of FIG. 9 is a very unfavorable range in the synchronous power-on/off, and a white circular range II of FIG. 9 is a very favorable range in the synchronous power-on/off. Specifically, in the range I, the impact generated in the synchronous power-on/off (change of torque peak or transit torque) is increased due to a large phase difference φ. In the range II, the phase difference φ is within the predetermined range, and the phase difference φ=0 can be realized in the present invention. Therefore, the impact generated in the synchronous power-on/off can be suppressed.

As indicated by the upper side of FIG. 9, in a case where the phase difference φ is positive (φ>0), the phase of the electric generator 20A is delayed with respect to the phase of the power supply equipment 14. Therefore, in the (1) switching direction, the predetermined range (φb<φ<φa) of the phase difference φ, which was close to the neutral position (φ≈0[deg]) is shifted to a lower position. In contrast, in the (2) switching direction, the predetermined range of the phase difference φ, which was close to the neutral position is shifted to a higher position. By shifting the predetermined range of the phase difference φ to a lower position or to a higher position depending on the situation as described above, the impact generated in the synchronous power-on/off can be effectively suppressed.

Figure 10:
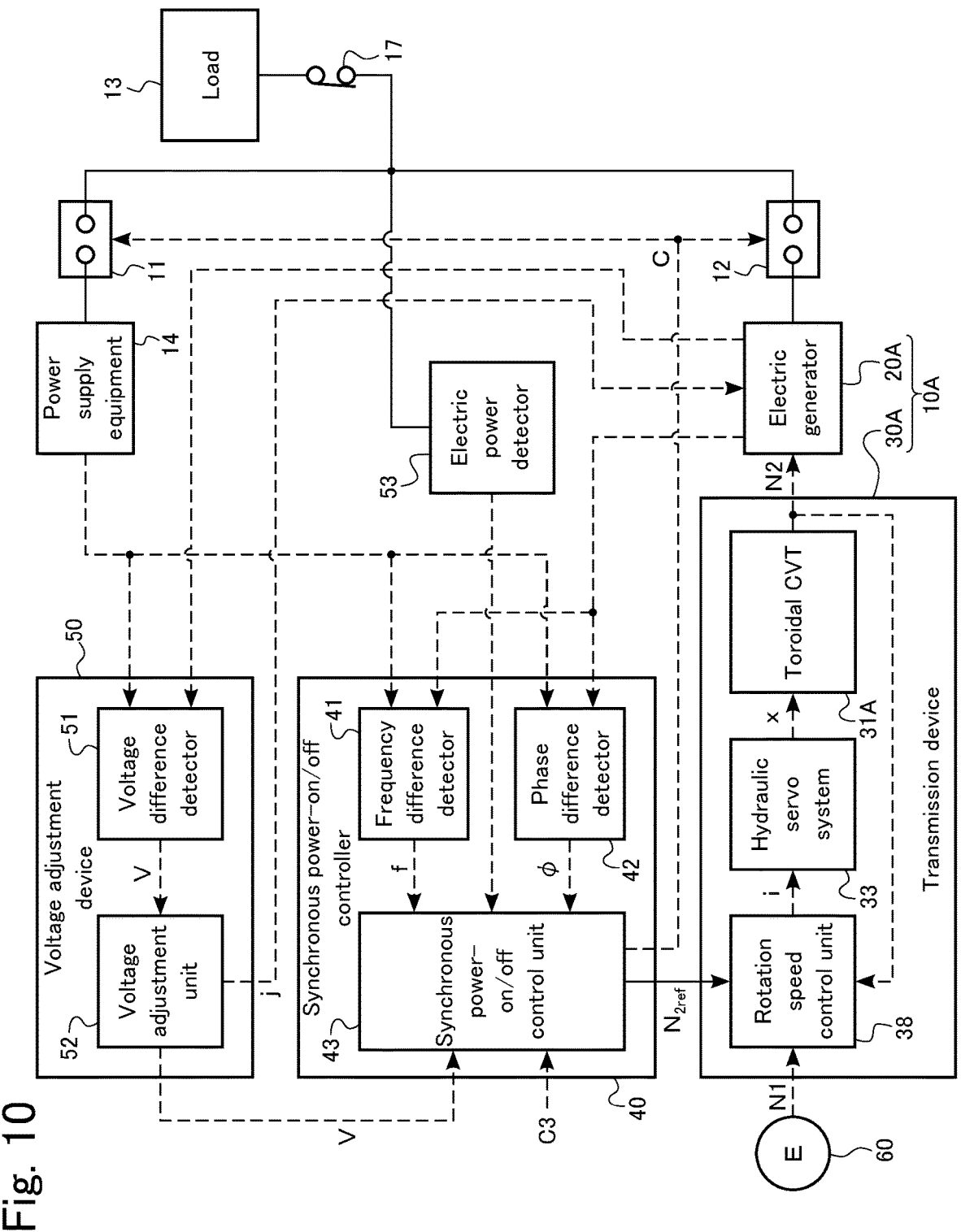
FIG. 10 is a schematic block diagram showing an example of the configuration of a synchronous power-on/off controller according to Embodiment 2 of the present invention.

In a case where the predetermined range of the phase difference φ is shifted as described above, for example, a synchronous power-on/off control system shown in FIG. 10 can be used. The synchronous power-on/off control system according to Embodiment 2 further includes an electric power detector 53 added to the components of the synchronous power-on/off control system according to Embodiment 1. Further, the synchronous power-on/off control system according to Embodiment 2 is configured to provide a switching command C3 to the synchronous power-on/off control unit 43.

The switching command C3 is a command used to detect which of the power supply equipment 14 and the electric generator 20A (electric power generation apparatus 10A), as the two electric power supply sources, is the electric power supply source on the "load side". The electric power detector 53 detects the electric power in the power supply equipment 14 and the electric power in the electric generator 20A, to obtain "load side information", to be precise, information indicating that the frequency of the electric power supply source on the load side is lower, and the phase of the electric power supply source on the load side is delayed. This information is provided to the synchronous power-on/off control unit 43. The other constituents are the same as those of the synchronous power-on/off control system according to Embodiment 1 and will not be specifically described.

Figure 11:
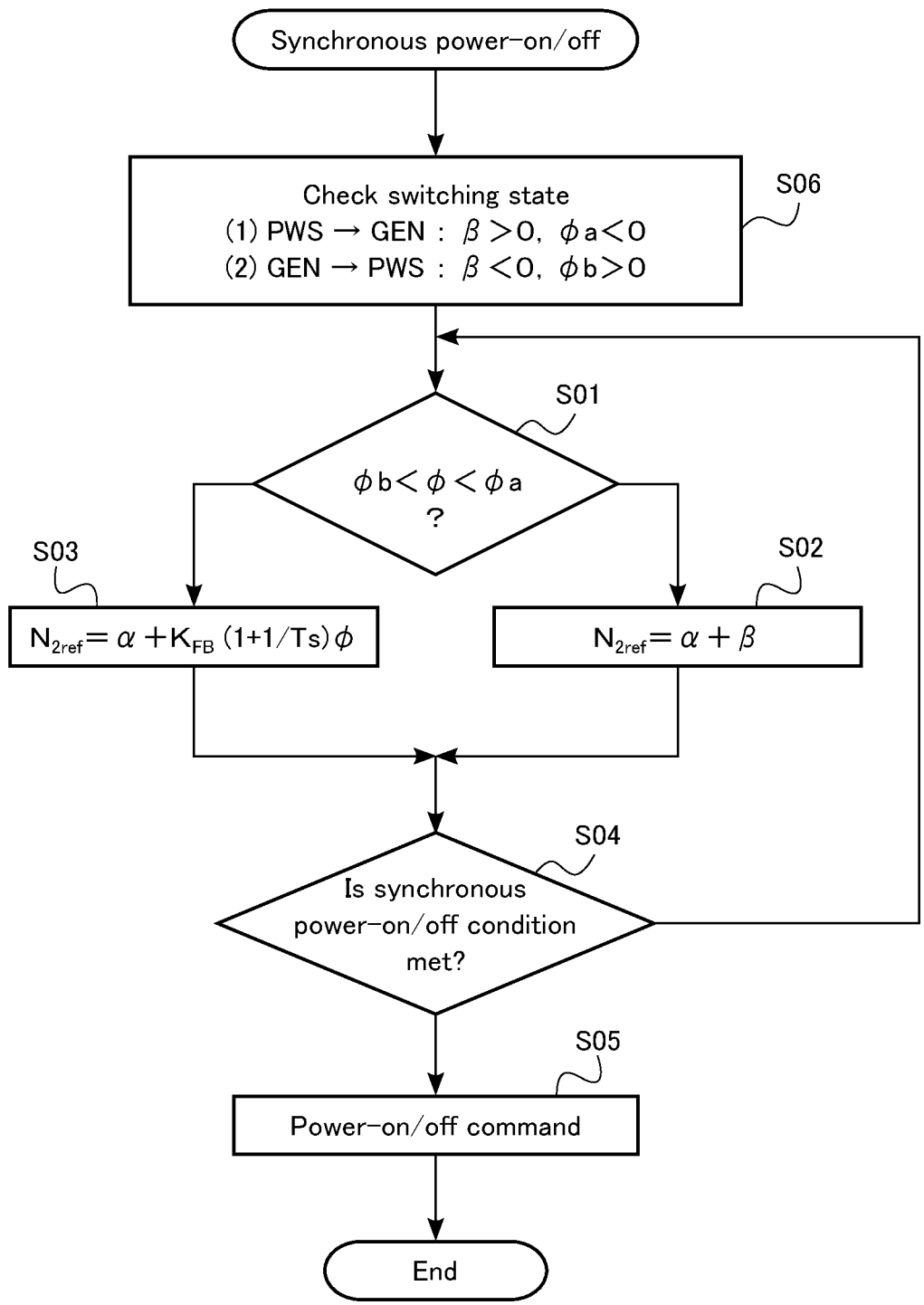
FIG. 11 is a flowchart showing an example of the synchronous power-on/off control method performed by the synchronous power-on/off controller of FIG. 9.

In the synchronous power-on/off control method performed by the synchronous power-on/off control system with the above-described configuration, for example, as shown in FIG. 11, step (step S06) for checking the switching state is added to the synchronous power-on/off control method according to Embodiment 1, before step S01.

In step S06, the synchronous power-on/off control unit 43 determines which of the power supply equipment 14 and the electric generator 20A is the electric power supply source on the load side, based on the switching command C3. In addition, the synchronous power-on/off control unit 43 determines that the frequency of the electric power supply source on the load side is lower and the phase of the electric power supply source on the load side is delayed, based on the "load side information" from the electric power detector 53. Based on this determination result, the synchronous power-on/off control unit 43 shifts the predetermined range (φa <φ<φb) of the phase difference φ as shown in FIG. 9.

This will be more specifically described. (1) In a case where the synchronous power-on/off control unit 43 determines that the power supply equipment 14 is the electric power supply source on the load side, the synchronous power-on/off control unit 43 sets the offset β to a value larger than zero (β>0), and shifts the predetermined range of the phase difference φ so that the upper limit value φa is smaller than 0 (φa <0). On the other hand, (2) in a case where the synchronous power-on/off control unit 43 determines that the electric generator 20A is the electric power supply source on the load side, the synchronous power-on/off control unit 43 sets the offset β to a value smaller than zero (β<0), and shifts the predetermined range of the phase difference γ so that the lower limit value φb is larger than 0 (φb >0).

The steps following step S06, namely, step S01 to step S05 in FIG. 11 have already been described in Embodiment 1, and detailed description thereof will be omitted.

Embodiment 3

In the electric power generation apparatus 10A for the aircraft according to Embodiment 1 and Embodiment 2, as shown in FIG. 2, the electric power generation apparatus 10A has the series configuration, and the toroidal CVT 31A used in the transmission device 30A has the center input configuration. However, the present invention is not limited to this. For example, in Embodiment 3, as shown in FIG. 12, a toroidal CVT 31B is combined with an epicyclic gear mechanism 27.

Figure 12:
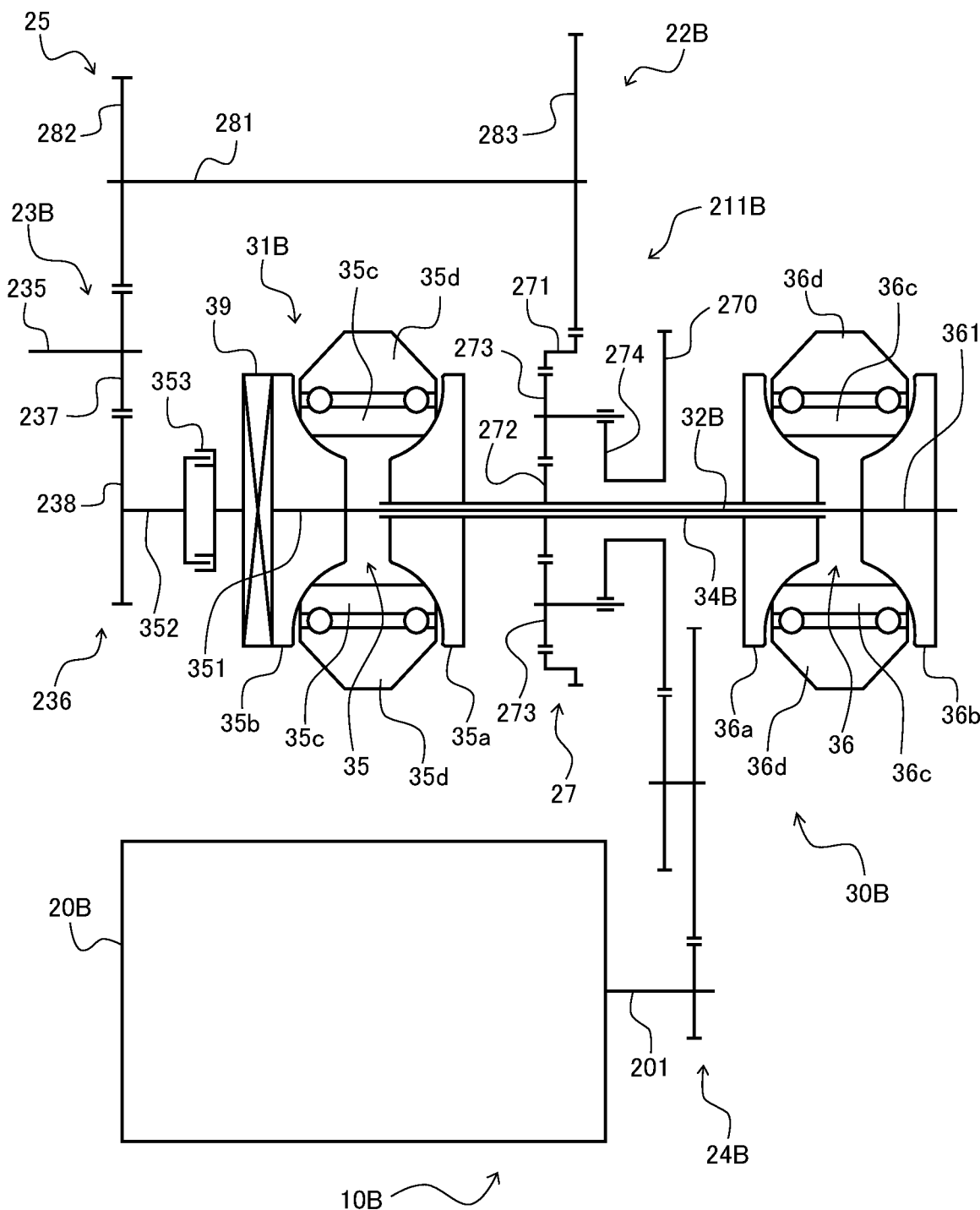
FIG. 12 is a schematic view showing an example of the specific configuration of an electric power generation apparatus for an aircraft to which a synchronous power-on/off control method and a synchronous power-on/off controller according to Embodiment 3 of the present invention are applied.

Specifically, as shown in FIG. 12, the basic configuration of an electric power generation apparatus 10B for the aircraft according to Embodiment 3 is the same as that of the electric power generation apparatus 10A for the aircraft according to Embodiment 1. A toroidal CVT 31B included in a transmission device 30B has a double-cavity configuration. Note that the toroidal CVT 31B has a double-cavity configuration and a center output configuration, and the epicyclic gear mechanism 27 is disposed between the first cavity 35 and the second cavity 36.

In the toroidal CVT 31B, a transmission input shaft 32B is inserted into a transmission output shaft 34B with a hollow structure, and includes two protruding parts 351, 361. Two input discs 35a, 36a are disposed back-to-back on the transmission output shaft 34B. The first input disc 35a is provided at the first protruding part 351 and faces a first output disc 35b. The second input disc 36a is provided at the second protruding part 361 and faces a second output disc 36b. A clamping mechanism 39 is provided at the input discs 35a, 35b, and the protruding parts 351, 361. An input path 23B is disposed coaxially with the transmission input shaft 32B and includes an extended shaft 352. The extended shaft 352 is provided with a driven gear 238 of an input gear 236. The extended shaft 352 is joined to one of the protruding parts 351, 361 (e.g., first protruding part 351) via a dog clutch 353.

The electric power generation apparatus 10B has a power split configuration. A driving power transmission path 211B of a CSD 22B includes a power dividing path 25 which branches from the input path 23B and bypasses the toroidal CVT 31B. The CSD 22B includes the epicyclic gear mechanism 27 connected to the toroidal CVT 31B, the downstream end of the power dividing path 25, and the upstream end of an output path 24B. In the center output configuration, the epicyclic gear mechanism 27 and the upstream end of the output path 24B are disposed between two cavities 35, 36.

The power dividing path 25 includes a power dividing shaft 281, a first gear 282 which is provided at the power dividing shaft 281 and is in mesh with a driving gear 237 of the input gear 236, and a second gear 283 provided at the power dividing shaft 281. The epicyclic gear mechanism 27 includes a ring gear 271, a sun gear 272, a planet gear 273, and a carrier 274. The epicyclic gear mechanism 27 is placed coaxially with the transmission axis line P1. The ring gear 271 includes an external tooth and an internal tooth. The second gear 283 of the power dividing path 25 is in mesh with the external tooth of the ring gear 271. The sun gear 272 is provided on the transmission output shaft 34B. The planet gear 273 is in mesh with the internal tooth of the ring gear 271 and the internal tooth of the sun gear 272. The planet gear 273 is supported by the carrier 274 in such a manner that the planet gear 273 is rotatable around its axis. An external gear 270 forming the upstream end of the output path 24B is provided at the carrier 274. The transmission output shaft 34B penetrates the carrier 274 and the external gear 270. The ring gear 271, the sun gear 272, and the carrier 274 are not fixed and are rotatable relative to each other. The planet gear 273 is rotatable around its axis and is able to revolve (revolvable).

In the above-described configuration, the rotational driving power of an electric power generation apparatus input shaft 235 is input to the toroidal CVT 31B via the input gear 236, the extended shaft 352 and the dog clutch 353. The rotational driving power is also sent to the power dividing path 25 via the input gear 236. The rotation output from the toroidal CVT 31B is input to the sun gear 271 of the epicyclic gear mechanism 27. The rotation output from the power dividing path 25 is input to the ring gear 271 of the epicyclic gear mechanism 27. These two rotations are put together in the epicyclic gear mechanism 27 and output to the carrier 274. Then, the rotation is transmitted to the generator shaft 201 via the output path 24B.

As described above, in the present embodiment, the rotational driving power for driving the electric generator 20B is divided to flow through the toroidal CVT 31B and the epicyclic gear mechanism 27, instead of transmitting all of the rotational driving power to the electric generator 20B through the toroidal CVT 31B. This makes it possible to extend the life of the toroidal CVT 31B, and reduce the weight of the toroidal CVT 31B.

In the present embodiment, the driving power is divided to flow through the toroidal CVT 31B and the epicyclic gear mechanism 27. In general, the upper limit of the driving power which can be transmitted by the CVT is relatively low. By dividing the driving power as described above, it becomes possible to increase the upper limit of the driving power which can be transmitted in the electric power generation apparatus 10B. Further, since the efficiency of the epicyclic gear mechanism 27 is high, the transmission efficiency of the driving power of the whole of the electric power generation apparatus 10B can be made high.

The synchronous power-on/off control method and synchronous power-on/off controller (and synchronous power-on/off control system including the synchronous power-on/off controller, shown in FIG. 4 or 10) in the electric power generation apparatus 10B are the same as those of Embodiment 1 or Embodiment 2 and detailed description thereof is omitted. The configuration of the electric generator 20B used in the present embodiment may be the same as that of the electric generator 20A used in Embodiment 1 or 2, or other known configuration may be used.

Embodiment 4

Although in the above-described Embodiments 1 to 3, the toroidal CVT 31A or 31B is configured to drive the power rollers 35c, 36c by the hydraulic cylinders 331, 332, the present invention is not limited to this. In Embodiment 4, for example, change amounts (tilt motion angle change amounts θg) of the tilt motion angles θ of the power rollers 35c, 36c are mechanically detected by power roller control mechanisms each including a cam and a lever. This makes it possible to feedback-control the tilt motion angles θ by changing the positions of the power rollers 35c, 36c.

Figure 13:
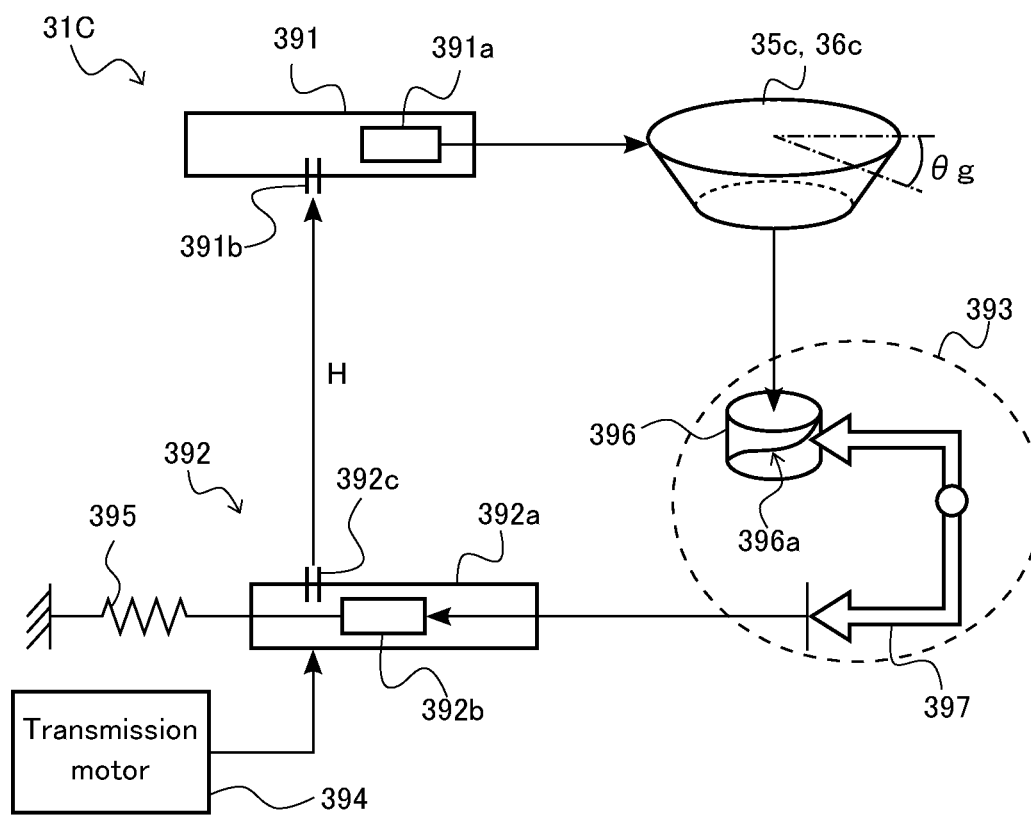
FIG. 13 is a schematic view showing an example of major constituents of a toroidal continuously variable transmission (toroidal CVT) used in an electric power generation apparatus for an aircraft to which a synchronous power-on/off control method and a synchronous power-on/off controller according to Embodiment 4 of the present invention are applied.

Specifically, as schematically shown in FIG. 13, a toroidal CVT 31C according to the present embodiment includes as major constituents the power rollers 35c, 36c, and the hydraulic servo system 33, as in the toroidal CVT 31A or 31B according to Embodiment 1 to Embodiment 3 described above. In addition, the toroidal CVT 31C includes power roller control mechanisms 39.

Each of the power roller control mechanisms 39 includes a hydraulic cylinder 391, a control valve mechanism 392, and a tilt motion angle change amount detecting mechanism 393. The hydraulic cylinder 391 is a hydraulic actuator which changes the position of the power roller 35c, 36c. The hydraulic cylinder 391 has basically the same configuration as that of the first hydraulic cylinder 331 and the second hydraulic cylinder 332 of Embodiment 1. In FIG. 13, for easier description, a piston 391a and an oil passage port 391b are shown, and oil passages and the like are not shown. The control valve mechanism 392 adjusts the flow rate of the oil supplied to the hydraulic cylinder 391. The tilt motion angle change amount detecting mechanism 393 mechanically detects the tilt motion angle change amount θg and controls the valve opening rate of the control valve mechanism 392 in response to the detected change amount.

The control valve mechanism 392 includes a sleeve 392a driven by a transmission motor 394, a spool valve 392b fitted to the inner diameter portion of the sleeve 392a, and a spring 395 which pushes the spool valve 392b. The sleeve 392a is provided with an oil passage port 392c which can be opened and closed by the spool valve 392b. Thus, the control valve mechanism 392 corresponds to the servo valve 333 of the hydraulic servo system 33. The tilt motion angle change amount detecting mechanism 393 includes a cam 396 and a lever 397.

A pushing force applied by the lever 397 can be input to the spool valve 392b of the control valve mechanism 392. The lever 397 is driven by the cam 396. The cam 396 is coupled to each of the trunnions 35d, 36d (not shown) which support the power rollers 35c, 36c. The cam 396 has an inclined surface 396a. By rotating the cam 396, the lever 397 can be swung.

To the power roller control mechanisms 39 with the above-described configuration, a transmission command directing a target transmission ratio (target transmission gear ratio) in the transmission mechanism based on the rotation position of the transmission motor 394 is provided. Then, the valve opening rate of the control valve mechanism 392 is controlled in response to the tilt motion angle change amount θg mechanically detected by the tilt motion angle change amount detecting mechanism 393. In this way, the flow rate (arrow H of FIG. 13) of the oil to be supplied to the hydraulic cylinder 391 is adjusted, and the position command for the power roller 35c, 36c is provided. In response to the change in the flow rate of the supplied oil, the position of the piston 391a of the hydraulic cylinder 391 is changed, and the position of the power roller 35c, 36c is adjusted.

In Embodiment 1 to Embodiment 3 described above, the rotation speed control unit 38 of the transmission device 30A is configured to generate the servo valve opening rate command i based on the engine speed N1 of the engine 60, the generator drive rotation speed N2 of the toroidal CVT 31A or 31B, and the generator rotation speed command $N_{2ref}$ calculated by the synchronous power-on/off control unit 43. In contrast, in the present embodiment, the rotation speed control unit 38 is configured to generate the servo valve opening rate command i based on the tilt motion angle change amount θg detected by the power roller control mechanisms 39, in addition to the engine speed N1 of the engine 60, the generator drive rotation speed N2 of the toroidal CVT 31C, and the generator rotation speed command $N_{2ref}$ calculated by the synchronous power-on/off control unit 43. This makes it possible to well control the tilt motion angles θ of the power rollers 35c, 36c.

Therefore, in accordance with the present embodiment, as in the above-described Embodiment 1, even in a case where various noises are accumulated in the hydraulic servo system 33 or the power roller control mechanisms 39 and thereby the change in the phase difference stagnates, it becomes possible to quickly realize good synchronous power-on/off conditions without considering that the change in the phase difference stagnates, and more effectively suppress an impact generated in the synchronous power-on/off.

Since the constituents which are other than the constituents shown in FIG. 13, of the toroidal CVT 31C according to the present embodiment, are the same as those of the toroidal CVT 31A or 31B of Embodiment 1 to Embodiment 3 described above, the specific description thereof is omitted. In addition, since the specific configurations of the electric power generation apparatus including the toroidal CVT 31C according to the present embodiment, and the synchronous power-on/off control method and the synchronous power-on/off controller in the electric power generation apparatus are the same as those of Embodiment 1 to Embodiment 3 described above, except the above-described generation of the servo valve opening rate command i, the detailed description is omitted.

Embodiment 5

Although in Embodiment 1 to Embodiment 4 described above, the present invention has been described in conjunction with the electric power generation apparatus for the aircraft as an example, the present invention is not limited to the field of the aircraft, and is applicable to other electric power generation apparatuses or electric power generation systems. In Embodiment 5, the synchronous power-on/off control method and synchronous power-on/off controller of the present invention will be described in conjunction with a gas turbine drive electric power generation system as an example.

Figure 14:
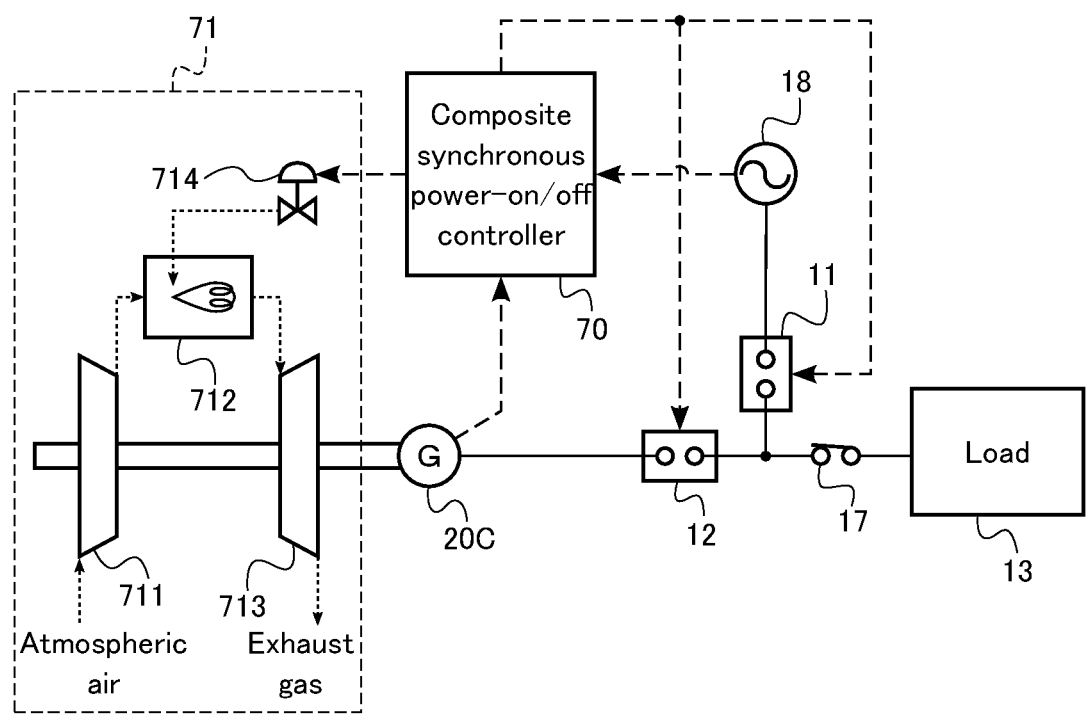
FIG. 14 is a schematic view showing an example of the configuration of a gas turbine drive electric power generation system to which a synchronous power-on/off control method and a synchronous power-on/off controller according to Embodiment 5 of the present invention are applied.

As shown in FIG. 14, in the present embodiment, a gas turbine drive electric power generation system 71 includes a composite synchronous power-on/off controller 70, the first breaker 11, the second breaker 12, the load 13, the contact 17, power supply equipment 18, and an electric generator 20C. The composite synchronous power-on/off controller 70 includes the synchronous power-on/off controller 40, the voltage adjustment device 50, the rotation speed control unit 38, and the hydraulic servo system 33 of Embodiment 1 to Embodiment 4 described above. The electric generator 20C includes any one of the toroidal CVT 31A to 31C of Embodiment 1 to Embodiment 4 described above. It is sufficient that the power supply equipment 18 is, for example, a known power supply utility. The other constituents of the present embodiment are the same as those of Embodiment 1 to Embodiment 4 described above, and detailed description thereof is omitted.

The gas turbine drive electric power generation system 71 has a general configuration. The gas turbine drive electric power generation system 71 includes a compressor 711, a combustor 712, a turbine 713, and a fuel adjustment valve 714. The compressor 711 takes in air from atmospheric air, and feeds with a pressure the air to the combustor 712. The combustor 712 heats the compressed air and feeds with a pressure the compressed air to the turbine 713. The turbine 713 is driven by the heated compressed air, and operates the electric generator 20C. The fuel adjustment valve 714 adjusts the flow rate of the compressed air flowing through the combustor 712. Thus, the gas turbine drive electric power generation system 71 serves as a driving power source for the electric generator 20C.

In the present embodiment, the composite synchronous power-on/off controller 70 detects parameters associated with the synchronous power-on/off conditions from the power supply equipment 18 and the electric generator 20C, and adjusts the generator drive rotation speed N2 by adjusting the opening rate of the fuel adjustment valve 714. The specific synchronous power-on/off control method is the same as that of Embodiment 1 or Embodiment 2 described above, and the detailed description thereof is omitted.

As described above, in the turbine drive electric power generation system of the present embodiment, an allowable (permissible) range in the synchronous power-on/off is wider than that in the switching without instantaneous interruption (temporary blackout) in the field of aircraft. For this reason, in the synchronous power-on/off in the electric power generation system, for example, an operator can manually perform switching. In the present invention, since the phase difference φ=0 can be realized in the phase difference feedback control, it becomes possible to quickly and well realize the synchronous power-on/off conditions. Therefore, the present invention is applicable to a case where the synchronous power-on/off in the electric power generation system is automatically switched.

Embodiment 6

In Embodiment 5, the gas turbine drive electric power generation system has been described as an example which is other than the electric power generation apparatus for the aircraft. In Embodiment 6, the synchronous power-on/off control method and synchronous power-on/off controller of the present invention will be described in conjunction with a steam turbine drive electric power generation system as an example.

Figure 15:
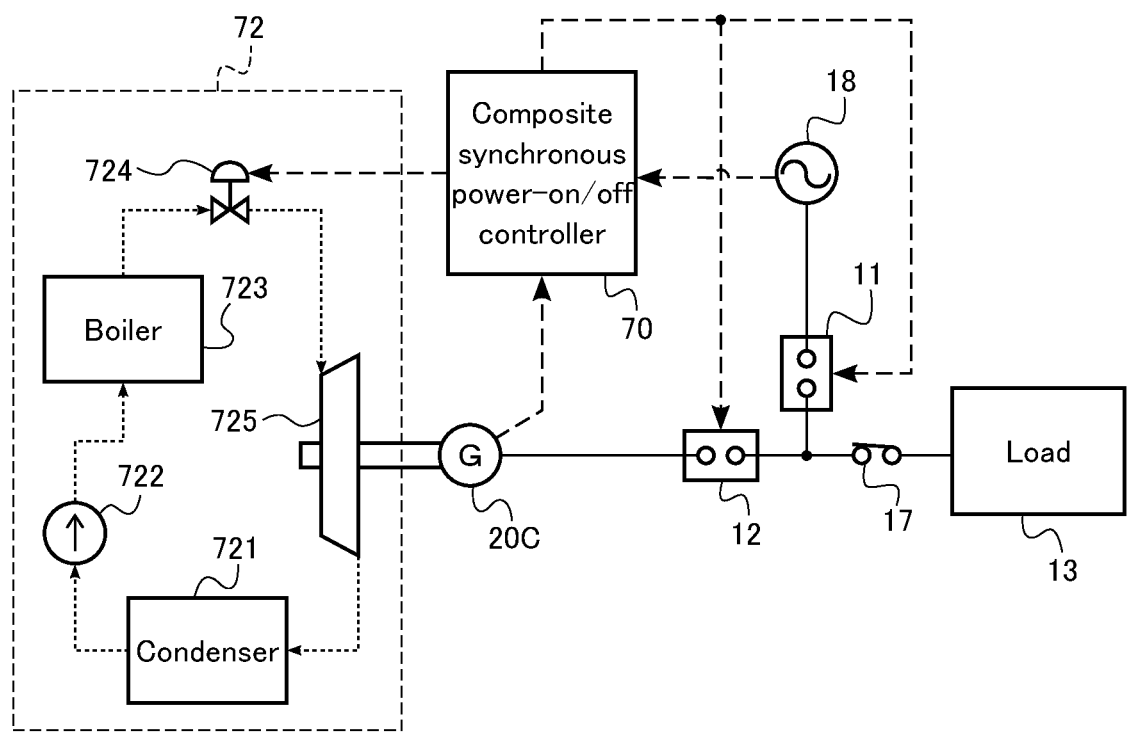
FIG. 15 is a schematic view showing an example of the configuration of a steam turbine drive electric power generation system to which a synchronous power-on/off control method and a synchronous power-on/off controller according to Embodiment 6 of the present invention are applied.

As shown in FIG. 15, in the present embodiment, a steam turbine drive electric power generation system 72 includes the composite synchronous power-on/off controller 70, the first breaker 11, the second breaker 12, the load 13, the contact 17, the power supply equipment 18, and the electric generator 20C. The composite synchronous power-on/off controller 70, the electric generator 20C, and the power supply equipment 18 are the same as those of Embodiment 5, and the other constituents are the same as those of Embodiment 1 to Embodiment 4. Therefore, the description thereof is omitted.

The steam turbine drive electric power generation system 72 has a general configuration. The steam turbine drive electric power generation system 72 includes a condenser 721, a water supply pump 722, a boiler 723, a steam pressure adjustment valve 724, and a turbine 725. The condenser 721 cools and condenses a steam discharged from the turbine 725. The water supply pump 722 feeds with a pressure the condensed water generated by the condenser 721 to the boiler 723. The boiler 723 heats the water fed by the water supply pump 722 to generate the steam. The steam pressure adjustment valve 724 adjusts the pressure of the steam flowing through the boiler 723. The turbine 725 is driven by the steam supplied from the boiler 723 to operate the electric generator 20C. Thus, the steam turbine drive electric power generation system 72 serves as a driving power source for the electric generator 20C.

In the present embodiment, the composite synchronous power-on/off controller 70 detects the parameters associated with the synchronous power-on/off conditions from the power supply equipment 18 and the electric generator 20C, and adjusts the generator drive rotation speed N2 by adjusting the opening rate of the steam pressure adjustment valve 724. Since the specific synchronous power-on/off control method is the same as that of Embodiment 1 or Embodiment 2, the detailed description thereof is omitted.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

REFERENCE SIGNS LIST 10A, 10B electric power generation apparatus for aircraft (electric power generation apparatus)
11 first breaker
12 second breaker
13 load
14, 18 power supply equipment (electric power supply source)
20A, 20B, 20B electric generator (electric power supply source)
27 epicyclic gear mechanism
30A, 30B transmission device
31A, 31B, 31C toroidal continuously variable transmission (continuously variable transmission)
32A, 32B transmission input shaft
33 hydraulic servo system
34A, 34B transmission output shaft
35, 36 cavity
35a, 36a input disc
35b, 36b output disc
35c, 36c power roller
35d, 36d trunnion
37, 39 clamping mechanism
38 rotation speed control unit
39 power roller control mechanism
40 synchronous power-on/off controller
41 frequency difference detector
42 phase difference detector
43 synchronous power-on/off control unit
50 voltage adjustment device
51 voltage difference detector
52 voltage adjustment unit
53 electric power detector
60 engine for aircraft (driving power source)
70 composite synchronous power-on/off controller
71 gas turbine drive electric power generation system (driving power source)
72 steam turbine drive electric power generation system (driving power source)
331, 332, 391 hydraulic cylinder (hydraulic actuator)
333 servo valve
392 control valve mechanism (servo valve)
396 cam
397 lever

The invention claimed is:

1. A synchronous power-on/off control method in which a power-on/off command is output to a breaker for switching in a case where a frequency difference between a plurality of electric power supply sources is within a predetermined range and a phase difference between the plurality of electric power supply sources is within a predetermined range, in switching of electric power supply between the plurality of electric power supply sources, at least one of the plurality of electric power supply sources including an electric generator which is driven by a driving power source via a transmission device, the synchronous power-on/off control method comprising:
   detecting the frequency difference and the phase difference between the plurality of electric power supply sources;
   determining whether or not the detected frequency difference is within the predetermined range, and whether or not the detected phase difference is within the predetermined range;
   feedback controlling a generator drive rotation speed of the transmission device so that the frequency difference is maintained at a value within the predetermined range and the phase difference is maintained at a value within the predetermined range, in a case where it is determined that the detected frequency difference is within the predetermined range and the detected phase difference is within the predetermined range;
   controlling the generator drive rotation speed of the transmission device by providing an offset to a rotation speed command of the transmission device, in a case where it is determined that the detected frequency difference is not within the predetermined range and the detected phase difference is not within the predetermined range; and
   calculating a generator rotation speed command by adding to the rotation speed command of the transmission device an output value obtained by subjecting the detected phase difference to a proportional-integral-control, feedback controlling the generator drive rotation speed based on the generator rotation speed command, and outputting the power-on/off command to the breaker, in a case where it is determined that the detected frequency difference is within the predetermined range and the detected phase difference is within the predetermined range.

2. The synchronous power-on/off control method according to claim 1, further comprising:
   detecting a voltage difference between the plurality of electric power supply sources, and outputting a field current command to the electric generator so that the detected voltage difference is within a predetermined range; and
   outputting the power-on/off command to the breaker in a case where the detected voltage difference is within the predetermined range, the frequency difference between the plurality of electric power supply sources is within the predetermined range and the phase difference between the plurality of electric power supply sources is within the predetermined range.

3. The synchronous power-on/off control method according to claim 1, further comprising:
   determining which of the plurality of electric power supply sources is connected to a load, and shifting the predetermine ranges so that a frequency of the electric power supply source connected to the load is lower than a frequency of the electric power supply source which is not connected to the load and a phase of the electric power supply source connected to the load is delayed with respect to a phase of the electric power supply source which is not connected to the load.

4. The synchronous power-on/off control method according to claim 1,
wherein the transmission device includes a toroidal continuously variable transmission.

5. The synchronous power-on/off control method according to claim 4,
wherein a tilt motion angle of a power roller included in the transmission device is adjusted by a hydraulic servo system,
wherein the hydraulic servo system includes a hydraulic actuator and a servo valve which drives the hydraulic actuator, and
wherein the servo valve is driven by a servo valve opening rate command based on an output rotation speed of the driving power source, the generator drive rotation speed of the transmission device, and the generator rotation speed command.

6. The synchronous power-on/off control method according to claim 4,
wherein the toroidal continuously variable transmission includes a clamping mechanism which generates a clamping force for pushing a power roller against an input disc and an output disc included in the transmission device.

7. The synchronous power-on/off control method according to claim 1,
wherein the driving power source is an engine for an aircraft.

8. A synchronous power-on/off controller in which a power-on/off command is output to a breaker for switching in a case where a frequency difference between a plurality of electric power supply sources is within a predetermined range and a phase difference between the plurality of electric power supply sources is within a predetermined range, in switching of electric power supply between the plurality of electric power supply sources, at least one of the plurality of electric power supply sources including an electric generator which is driven by a driving power source via a transmission device, the synchronous power-on/off controller comprising:
a frequency difference detector which detects the frequency difference between the plurality of electric power supply sources;
a phase difference detector which detects the phase difference between the plurality of electric power supply sources; and
a synchronous power-on/off control unit which determines whether or not the detected frequency difference is within the predetermined range and whether or not the detected phase difference is within the predetermined range, generates the power-on/off command, and outputs the power-on/off command to the breaker,
wherein the synchronous power-on/off control unit feedback-controls a generator drive rotation speed of the transmission device so that the frequency difference is maintained at a value within the predetermined range and the phase difference is maintained at a value within the predetermined range, in a case where the synchronous power-on/off control unit determines that the detected frequency difference is within the predetermined range and the detected phase difference is within the predetermined range,
wherein the synchronous power-on/off control unit controls the generator drive rotation speed of the transmission device by providing an offset to a rotation speed command of the transmission device, in a case where the synchronous power-on/off control unit determines that the detected frequency difference is not within the predetermined range and the detected phase difference is not within the predetermined range, and
wherein the synchronous power-on/off control unit calculates a generator rotation speed command by adding to the rotation speed command of the transmission device an output value obtained by subjecting the detected phase difference to a proportional-integral-control, feedback-controls the generator drive rotation speed based on the generator rotation speed command, and outputs the power-on/off command to the breaker, in a case where the synchronous power-on/off control unit determines that the detected frequency difference is within the predetermined range and the detected phase difference is within the predetermined range.

9. The synchronous power-on/off controller according to claim 8, further comprising:
a voltage difference detector which detects a voltage difference between the plurality of electric power supply sources; and
a voltage adjustment unit which outputs a field current command to the electric generator so that the detected voltage difference is within a predetermined range,
wherein the synchronous power-on/off control unit outputs the power-on/off command to the breaker in a case where the detected voltage difference is within the predetermined range, the frequency difference between the plurality of electric power supply sources is within the predetermined range and the phase difference between the plurality of electric power supply sources is within the predetermined range.

10. The synchronous power-on/off controller according to claim 8, further comprising:
an electric power detector which determines which of the plurality of electric power supply sources is connected to a load, and shifts the predetermine ranges so that a frequency of the electric power supply source connected to the load is lower than a frequency of the electric power supply source which is not connected to the load and a phase of the electric power supply source connected to the load is delayed with respect to a phase of the electric power supply source which is not connected to the load.

11. The synchronous power-on/off controller according to claim 8,
wherein the transmission device includes a toroidal continuously variable transmission.

12. The synchronous power-on/off controller according to claim 11,
wherein a tilt motion angle of a power roller included in the transmission device is adjusted by a hydraulic servo system, and
wherein the hydraulic servo system includes a hydraulic actuator and a servo valve which drives the hydraulic actuator, the synchronous power-on/off controller further comprising:
a rotation speed control unit which generates a servo valve opening rate command based on an output rotation speed of the driving power source, the generator drive rotation speed of the transmission device, and the generator rotation speed command calculated by the synchronous power-on/off control unit,
wherein the servo valve is driven based on the servo valve opening rate command.

13. The synchronous power-on/off controller according to claim 11,
wherein the toroidal continuously variable transmission includes a clamping mechanism which generates a clamping force for pushing a power roller against an input disc and an output disc included in the transmission device.

14. The synchronous power-on/off controller according to claim 8,
wherein the driving power source is an engine for an aircraft.

* * * * *